(12) United States Patent
Nix

(10) Patent No.: US 10,696,229 B2
(45) Date of Patent: Jun. 30, 2020

(54) EVENT RECORDING SYSTEM FOR A VEHICLE

(71) Applicant: MAGNA ELECTRONICS INC., Auburn Hills, MI (US)

(72) Inventor: Axel Nix, Birmingham, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/429,175

(22) Filed: Jun. 3, 2019

(65) Prior Publication Data
US 2019/0299860 A1  Oct. 3, 2019

Related U.S. Application Data

(63) Continuation of application No. 15/793,134, filed on Oct. 25, 2017, now Pat. No. 10,308,181, which is a
(Continued)

(51) Int. Cl.
*B60R 1/00* (2006.01)
*B60W 50/00* (2006.01)
*B60W 50/14* (2020.01)
*B60W 30/095* (2012.01)
*B60W 10/18* (2012.01)
(Continued)

(52) U.S. Cl.
CPC ............ *B60R 1/002* (2013.01); *B60W 10/18* (2013.01); *B60W 10/20* (2013.01); *B60W 30/09* (2013.01); *B60W 30/095* (2013.01); *B60W 50/0098* (2013.01); *B60W 50/14* (2013.01); *G06K 9/00798* (2013.01); *G06K 9/00805* (2013.01); *B60R 2300/8093* (2013.01); *B60W 2050/143* (2013.01); *B60W 2420/42* (2013.01);
(Continued)

(58) Field of Classification Search
CPC ............ B60R 1/002; B60R 2300/8093; G06K 9/00805; G06K 9/00798; B60W 30/09; B60W 30/095; B60W 10/20; B60W 10/18; B60W 50/14; B60W 50/0098; B60W 2554/80; B60W 2710/20; B60W 2710/18; B60W 2420/42; B60W 2050/143
USPC ........................................................ 348/148
See application file for complete search history.

(56) References Cited

U.S. PATENT DOCUMENTS 4,037,250 A  7/1977 McGahan et al.
4,937,945 A  7/1990 Schofield et al.
(Continued)

*Primary Examiner* — Allen C Wong
(74) *Attorney, Agent, or Firm* — Honigman LLP

(57) ABSTRACT

A vehicular event recording system suitable includes a camera and an event recorder having memory. An image processor processes image data captured by the camera for detecting objects. Based at least in part on processing by the image processor of captured image data, a potential lane leaving event or potential collision event is determined. The event recorder receives vehicle data via a vehicle data bus of the vehicle. Captured image data and received vehicle data during first and second time periods are stored in buffer memory of the event recorder and overwritten in respective subsequent time periods. Following determination of an event, captured image data and received vehicle data stored in buffer memory is transferred to data storage of the event recorder and captured image data and received vehicle data during a post-event time period is stored in data storage.

34 Claims, 16 Drawing Sheets

Related U.S. Application Data continuation of application No. 15/180,646, filed on Jun. 13, 2016, now Pat. No. 9,802,541, which is a continuation of application No. 13/970,868, filed on Aug. 20, 2013, now Pat. No. 9,365,162.

(60) Provisional application No. 61/684,877, filed on Aug. 20, 2012.

(51) Int. Cl.
*B60W 10/20* (2006.01)
*B60W 30/09* (2012.01)
*G06K 9/00* (2006.01)

(52) U.S. Cl.
CPC ..... *B60W 2554/80* (2020.02); *B60W 2710/18* (2013.01); *B60W 2710/20* (2013.01)

(56) References Cited

U.S. PATENT DOCUMENTS

| | | |
|---|---|---|
| 5,632,092 A | 5/1997 | Blank et al. |
| 5,670,935 A | 9/1997 | Schofield et al. |
| 5,752,065 A | 5/1998 | Staiger |
| 5,796,094 A | 8/1998 | Schofield et al. |
| 5,877,897 A | 3/1999 | Schofield et al. |
| 5,880,381 A | 3/1999 | Sathe |
| 5,924,212 A | 7/1999 | Domanski |
| 6,201,642 B1 | 3/2001 | Bos |
| 6,292,718 B2 | 9/2001 | Staiger |
| 6,353,392 B1 | 3/2002 | Schofield et al. |
| 6,396,397 B1 | 5/2002 | Bos et al. |
| 6,477,464 B2 | 11/2002 | McCarthy et al. |
| 6,498,620 B2 | 12/2002 | Schofield et al. |
| 6,571,136 B1 | 5/2003 | Staiger |
| 6,611,202 B2 | 8/2003 | Schofield et al. |
| 6,628,441 B1 | 9/2003 | Staiger |
| 6,629,033 B2 | 9/2003 | Preston et al. |
| 6,654,910 B1 | 11/2003 | Eibach et al. |
| 6,678,614 B2 | 1/2004 | McCarthy et al. |
| 6,690,268 B2 | 2/2004 | Schofield et al. |
| 6,693,518 B2 | 2/2004 | Kumata et al. |
| 6,778,073 B2 | 8/2004 | Lutter et al. |
| 6,806,452 B2 | 10/2004 | Bos et al. |
| 6,824,281 B2 | 11/2004 | Schofield et al. |
| 6,946,978 B2 | 9/2005 | Schofield |
| 6,950,312 B2 | 9/2005 | Staiger |
| 6,952,782 B2 | 10/2005 | Staiger |
| 6,989,736 B2 | 1/2006 | Berberich et al. |
| 7,004,593 B2 | 2/2006 | Weller et al. |
| 7,004,606 B2 | 2/2006 | Schofield |
| 7,038,577 B2 | 5/2006 | Pawlicki et al. |
| 7,050,089 B2 | 5/2006 | Nakamura |
| 7,123,168 B2 | 10/2006 | Schofield |
| 7,140,026 B2 | 11/2006 | Staiger |
| 7,146,260 B2 | 12/2006 | Preston et al. |
| 7,156,168 B2 | 1/2007 | Gutbrod et al. |
| 7,167,796 B2 | 1/2007 | Taylor et al. |
| 7,178,049 B2 | 2/2007 | Lutter |
| 7,205,904 B2 | 4/2007 | Schofield |
| 7,346,435 B2 | 3/2008 | Amendola et al. |
| 7,349,844 B2 | 3/2008 | Staiger |
| 7,355,524 B2 | 4/2008 | Schofield |
| 7,412,328 B2 | 8/2008 | Uhlmann et al. |
| 7,463,281 B2 | 12/2008 | Luskin et al. |
| 7,474,963 B2 | 1/2009 | Taylor et al. |
| 7,511,607 B2 | 3/2009 | Hubbard et al. |
| 7,579,939 B2 | 8/2009 | Schofield et al. |
| 7,702,133 B2 | 4/2010 | Muramatsu et al. |
| 7,777,611 B2 | 8/2010 | Desai |
| 7,783,403 B2 | 8/2010 | Breed |
| 7,965,336 B2 | 6/2011 | Bingle et al. |
| 8,054,384 B2 | 11/2011 | Yang et al. |
| 8,077,921 B2 | 12/2011 | Kawasaki |
| 8,086,771 B2 | 12/2011 | Staiger |
| 8,207,868 B2 | 6/2012 | Watanabe |
| 8,508,350 B2 | 8/2013 | Nix et al. |
| 8,625,778 B2 | 1/2014 | Jung et al. |
| 9,365,162 B2 | 6/2016 | Nix |
| 9,802,541 B2 | 10/2017 | Nix |
| 10,308,181 B2 | 6/2019 | Nix |
| 2003/0137586 A1 | 7/2003 | Lewellen |
| 2003/0222982 A1 | 12/2003 | Hamdan et al. |
| 2005/0093975 A1 | 5/2005 | Hamdan et al. |
| 2005/0154475 A1 | 7/2005 | Forchert et al. |
| 2005/0174429 A1 | 8/2005 | Yanai |
| 2008/0219274 A1 | 9/2008 | Kato et al. |
| 2009/0201192 A1* | 8/2009 | Tokoro ............. B60R 21/0134 342/70 |
| 2009/0265103 A1 | 10/2009 | Kostepen |
| 2012/0002053 A1* | 1/2012 | Stein ................ G06K 9/00818 348/148 |
| 2012/0062743 A1* | 3/2012 | Lynam ................ B60Q 9/005 348/148 |
| 2012/0218412 A1 | 8/2012 | Dellantoni et al. |
| 2013/0286204 A1* | 10/2013 | Cheng ................... H04N 5/33 348/148 |
| 2014/0092252 A1 | 4/2014 | Nix |

* cited by examiner

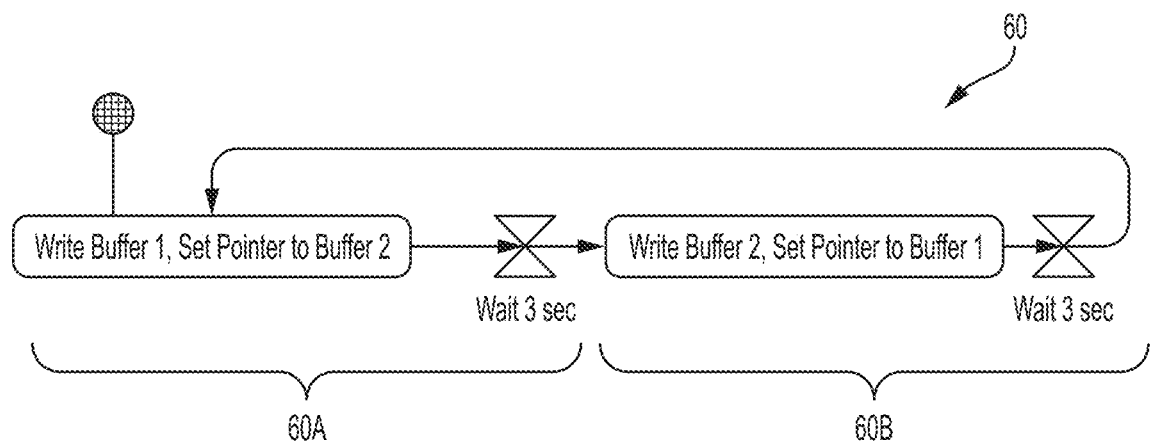
FIG. 4
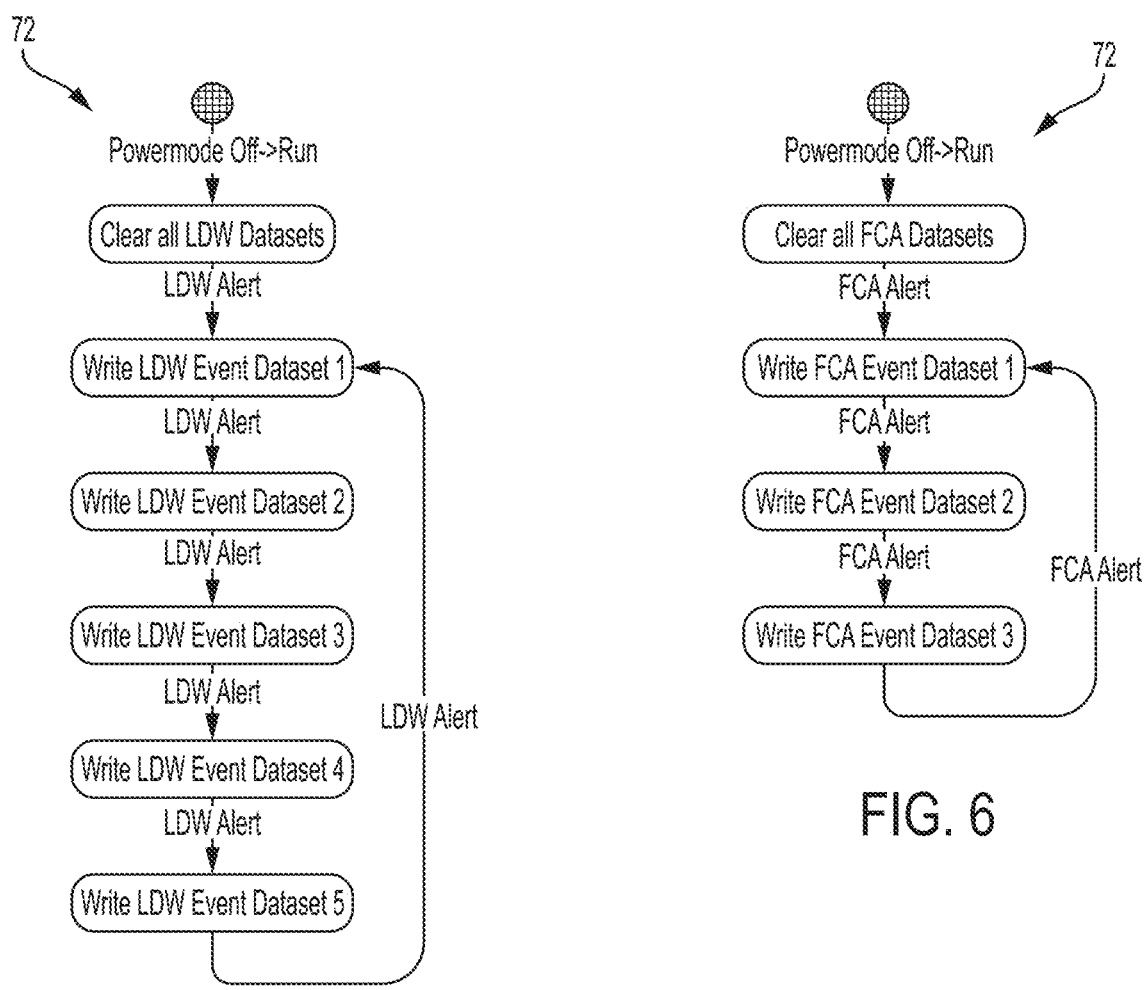
FIG. 5
FIG. 6

EVENT RECORDING SYSTEM FOR A VEHICLE

CROSS REFERENCE TO RELATED APPLICATIONS

The present application is a continuation of U.S. patent application Ser. No. 15/793,134, filed Oct. 25, 2017, now U.S. Pat. No. 10,308,181, which is a continuation of U.S. patent application Ser. No. 15/180,646, filed Jun. 13, 2016, now U.S. Pat. No. 9,802,541, which is a continuation of U.S. patent application Ser. No. 13/970,868, filed Aug. 20, 2013, now U.S. Pat. No. 9,365,162, which claims the filing benefit of U.S. provisional application Ser. No. 61/684,877, filed Aug. 20, 2012, which is hereby incorporated herein by reference in its entirety.

FIELD OF THE INVENTION

The invention generally relates to the field of driver assistance systems.

BACKGROUND OF THE INVENTION

A driver assistance system (DAS) monitors the surrounding environment of an automotive vehicle and provides feedback to the driver to warn about a potentially hazardous event that may occur if the driver does not take corrective action.

In a typical DAS commercially available today, a camera is mounted to the front windshield of a vehicle to monitor a region forward of the vehicle. The camera is connected to an image processor or digital signal processor which is programmed to analyze the images obtained by the camera and determine whether or not a predefined probability event exists. For example, the image processor may track objects in the field of view, estimate the distance to each object and determine whether or not the trajectory of the vehicle lies in the path of the object. In the event the vehicle is heading towards a given object and the distance between the vehicle and the given object is less than a predefined threshold, the image processor may recognizes this situation as a 'forward collision' probability event and send a forward collision alert (FCA) to the driver. The alert may be provided in a number of different ways depending on the DAS system in question, such as an audible sound, or a momentarily application of the brakes or automatically turning off a cruise control.

Similarly, the image processor may analyze the lane markings on the roadway to determine if the vehicle is heading towards and touches or is within a certain distance of the edge of the lane marking for a certain time when the turn signal is not activated. In this case the image processor may recognize this situation as a 'lane departure' probability event and alert the driver that he or she is unintentionally veering out of the current lane and provide a lane departure warning (LDW) to the driver such as a vibration or tug in the steering wheel.

There are a variety of other DAS systems that have been deployed commercially which use optical cameras, radar, or ultrasonic sensors to sense a spatial region external to the vehicle. Examples of other DAS systems are ultrasonic backup warning systems, which warn the driver of a potential obstacle in the path of the vehicle when the vehicle is placed in reverse and provide a louder and louder chime as the vehicle gets closer to an obstacle; radar based side collision systems, which scan the blind spots of the vehicle that are not viewable by the external side mirrors to warn of another vehicle in the blind spot by flashing a light or lamp in the external side view mirror; or camera based high beam systems, which determine whether or not the vehicle is close enough to another vehicle so as to alert the driver or automatically control for the driver the application of the low beam and high beam lights.

In each of these cases, the developers of the DAS system most likely tested their systems to ensure that the DAS system met certain objectives. Nevertheless, it would be beneficial to know just how useful such DAS systems are to the public at large. Do they in fact work well under real world conditions? Is the extra cost of such systems justified because they save lives? Should such systems be made mandatory? Or is the efficacy of such systems only marginal because they raise too many false positives that are ignored by drivers?

The first step in answering such questions entails the necessity of collecting useful statistical information with respect to the efficacy of the DAS employed in the automotive vehicle. This leads to the problem of what data to collect, and how to collect it given that the DAS has to continuously monitor certain data that the system must analyze while needing to retain certain data for statistical purposes. The limited memory storage capacity of vehicle control system(s) is also a problem.

SUMMARY OF THE INVENTION

Generally speaking, the present invention provides a method and system for obtaining useful statistical information with respect to the efficacy of the DAS employed in the automotive vehicle. When the DAS recognizes one or more probability events, the system captures and stores the probability event as well as pre-event and post-event data for subsequent retrieval.

According to a first aspect of the present invention, a method of obtaining data or information relating to a driver assistance system installed on a vehicle is provided. The driver assistance system includes a sensor (such as a camera) for sensing a region or spatial region external to the vehicle. The method includes capturing sensory data (such as images) pertaining to the external spatial region as the vehicle moves; buffering a first group of vehicle signals and storing a pre-event value for each signal of the first group in a pre-event buffer; and analyzing the sensory data to detect one or more types of probability events. When a given probability event is detected, the method monitors a second group of vehicle signals for a post-event time period after the occurrence of the given probability event and, during the post event time period, a signal of the second group is processed with a predetermined function to generate a post-event signal value. Data is also recorded in a memory, wherein the recorded data comprises the type of detected probability event, the pre-event signal value, and the post-event signal value.

The method optionally, and desirably, monitors the first group of vehicle signals and continuously stores the values of these signals in a segmented memory buffer (having at least two buffer segments) in round robin fashion. Each buffer segment is used to store the most recent value of the first group of vehicle signals over a time interval "t". Thus, for example, if the time interval is 3 seconds and there are two buffer segments, the first buffer segment stores the values of the first group of vehicle signals for an initial 3 seconds, the second buffer segment stores the values of the first group of vehicle signals for the next 3 seconds, the first buffer segment would then be overwritten to store the values of the first group of vehicle signals for the next 3 seconds, and the second buffer segment would then be overwritten to store the values of the first group of vehicle signals for the next 3 seconds, and so on. When a probability event is detected, the pre-event data that is incorporated into the associated data set is obtained from the buffer segment that is currently inactive. This technique ensures that pre-event data is collected over a consistent time period that is no less than 1t old and no more than 2t old.

These and other objects, advantages, purposes and features of the present invention will become apparent upon review of the following specification in conjunction with the drawings.

BRIEF DESCRIPTION OF DRAWINGS

FIGS. 4-6 are flowcharts of various portion of the event recorder algorithm;

DETAILED DESCRIPTION OF PREFERRED EMBODIMENTS

Figure 1:
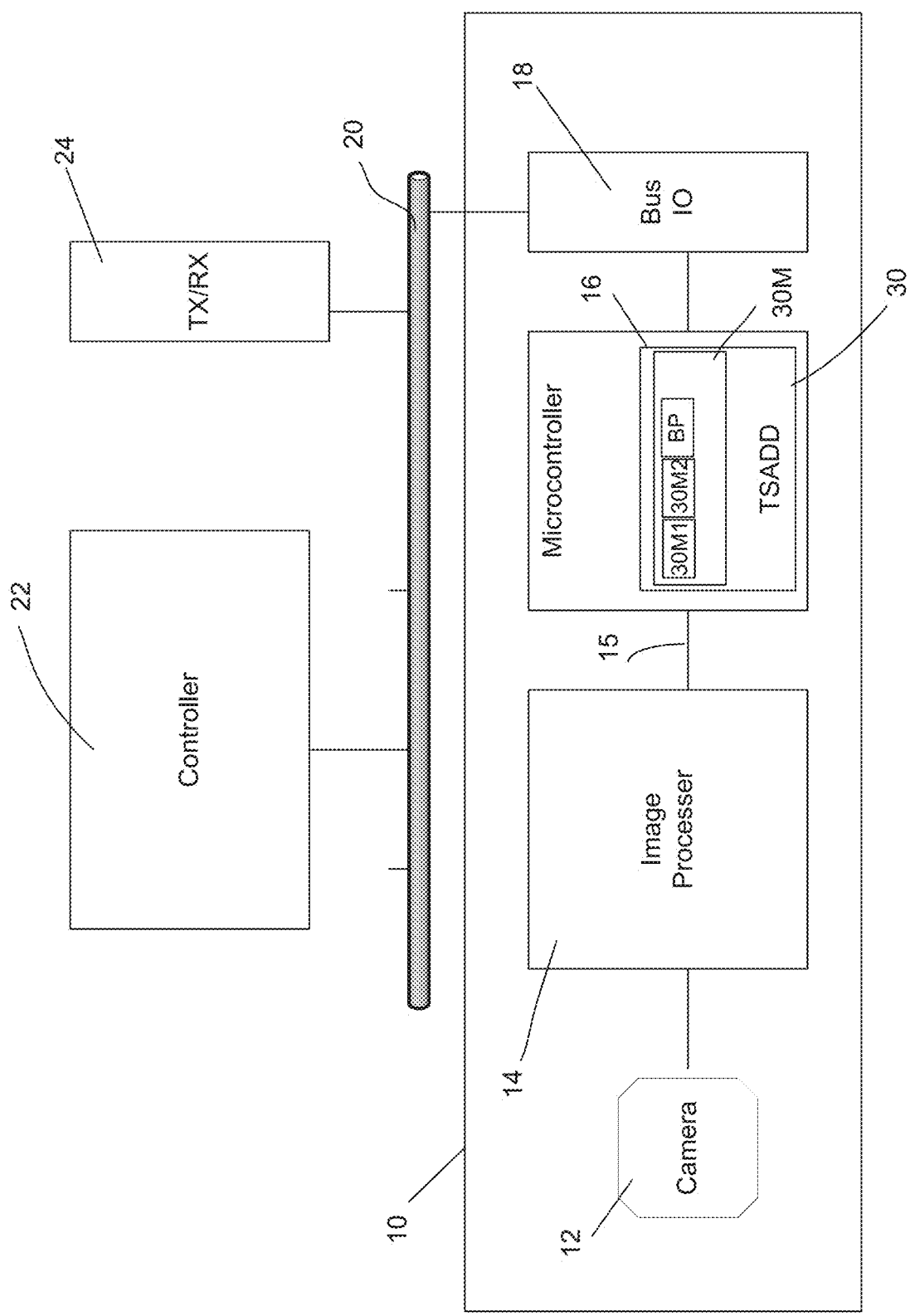
FIG. 1 is a system block diagram of a DAS system in conjunction with a vehicle control area network.

FIG. 1 shows a DAS system 10 in block diagram form. The DAS system 10 includes: a forward facing optical camera 12 mounted to the front windshield of a vehicle, an image processor 14, such as an EYEQ2™ processor commercially available from Mobileye N.V., which interprets the images obtained from the camera 12; a microcontroller 16, which connected to the image processor via a bus 15, for controlling and interpreting data obtained from the image processor; and a bus interface 18 for interfacing the DAS system 10 with a vehicle control area network (CAN) bus 20. The CAN bus 20 includes a vehicle controller 22 which is connected to various other subsystems and sensors (not shown) of the vehicle as known in the art and collects and provides vehicle operating data over the CAN bus 20. Such operating data includes information such as global positioning system (GPS) coordinates, vehicle speed, vehicle acceleration, steering angle, accelerometer position, brake deployment, airbag deployment, and anti-lock braking system (ABS) deployment and/or the like. A transceiver 24, such as an ONSTAR® module or telematics module, is also connected to the CAN bus 20 and is used to offload statistical information to a centralized external data bank, as discussed in greater below.

The DAS 10 includes a Trip Statistics and Alert Data Download (TSADD) subsystem 30, which in the illustrated embodiment is provided as a software module that is primarily executed by the microcontroller 16. The TSADD 30 collects and records pertinent data substantially at and around the time of a lane departure warning (LDW) or forward collision alert (FCA) alert generated by the image processor 14. The collected data includes the identity of the probability event or warning as well as contemporaneous event data related to the state of the vehicle substantially at the time the probability event. The collected data also includes pre-event and post-event data related to the state of the vehicle in respect of time periods shortly before and shortly after the probability event, as discussed in greater detail below. The event data includes information generated by the DAS 10 and information received on the CAN bus 20. The TSADD 30 makes the collected event data available to be read over the transceiver 24 so that after a certain period of time the collected event data can be transferred to the centralized external data bank or storage. For example, the TSADD 30 may be structured so that at the end of an ignition cycle the collected event data is transferred out via the ONSTAR® module to the centralized external data bank.

The goal of collecting event data around LDW and FCA alerts is to investigate the effectiveness of LDW and FCA systems through statistical post-processing of such data collected from many vehicles. The post processing will statistically analyze the event data to determine whether or not some action happened in response to the warning. For example, the vehicle may have had a certain heading (steering angle) before the LDW alert and then the vehicle changed heading/angle within a few seconds after the LDW alert. In this case, the post processing statistical analysis may conclude that the LDW alert was valid and effective and the driver actually acted on it. Similarly, the DAS 10 may have generated a FCA alert and the driver may have then applied the brakes just after receiving the FCA alert, in which case the post processing statistical analysis may conclude that the FCA alert was valid and effective and the driver actually acted on it.

The embodiment discussed in detail herein focuses on LDW and FCA alerts, but those skilled in the art will appreciate that any other DAS alert or warning may be tracked and the pertinent contemporaneous event, pre-event and post-event data associated therewith may be captured for subsequent retrieval and post-processing analysis. Also, the embodiment discussed in detail herein utilizes the ONSTAR® system and its associated communication protocol for downloading event data, but those skilled in the art will appreciate that a wide variety of other telematics or communication systems and modules and protocols may be utilized for communicating such information.

Figure 2:
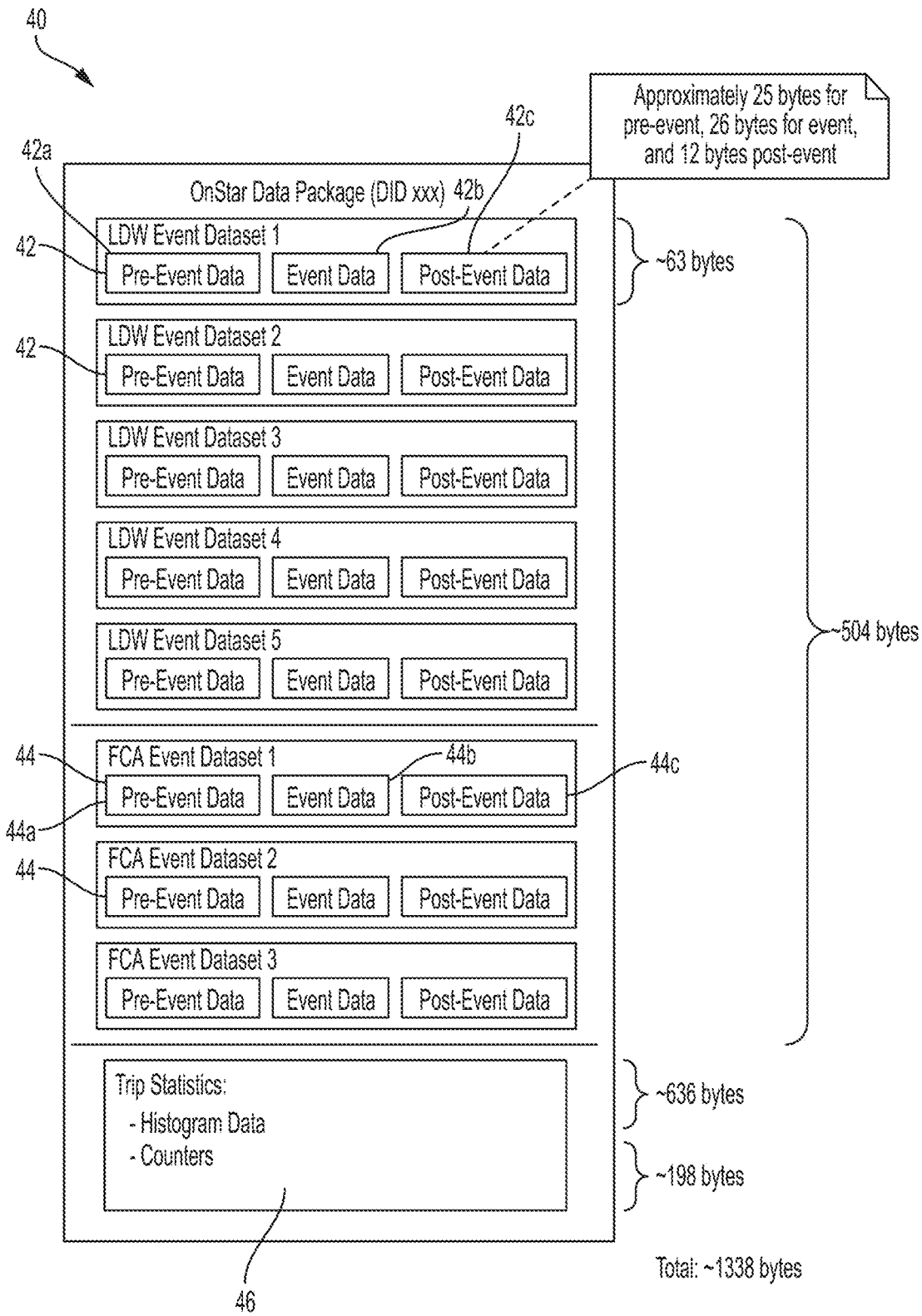
FIG. 2 is a block diagram of a data collection format.

FIG. 2 shows the format of an ONSTAR® data collection 40, which is used to communicate event data, and which is maintained in a microcontroller memory 30M (FIG. 1). The data collection 40 is subdivided into a first set 42 of LDW records or datasets, a second set 44 of FCA records, and a third set 46 of histograms and counters. Each LDW dataset 42 includes pre-event data 42a, contemporaneous event data 42b and post-event data 42c. Likewise, each FCA dataset 44 includes pre-event data 44a, contemporaneous event data 44b and post-event data 44c. Due to capacity constraints, the TSADD 30 may only store a limited number of LDW and FCA records (five and three, respectively, in the illustrated embodiment, although this may be varied in alternate embodiments). The third set 44 comprises a predetermined number of variables or counters which are incremented or adjusted, as discussed in greater detail below.

Figure 3:
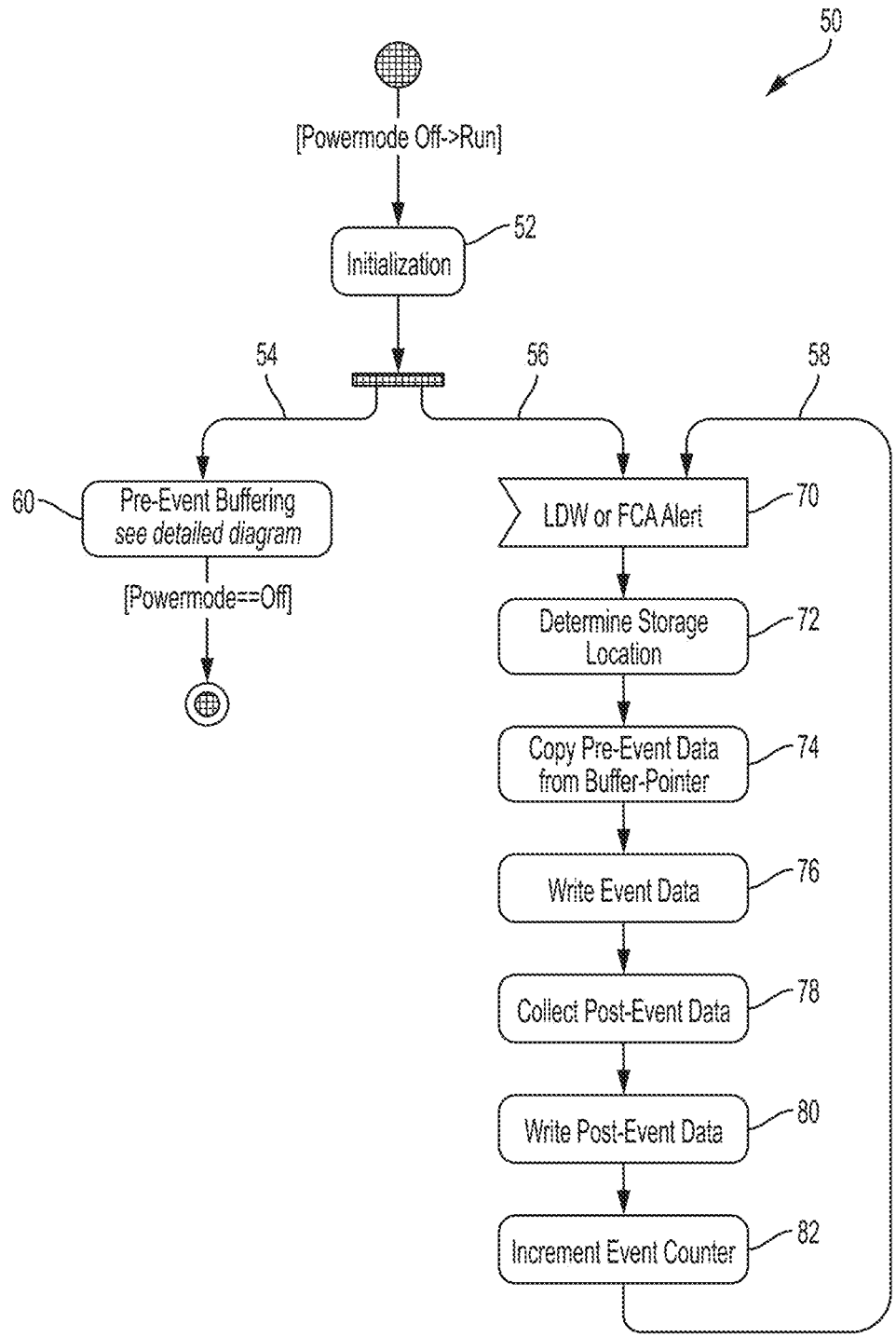
FIG. 3 is a flowchart of an event recorder algorithm.

The TSADD 30 includes an Event Recorder 50, which is executed by the microcontroller 16 as illustrated by the algorithm shown in FIG. 3.

Upon start up, when the operating status of the DAS 10 changes from 'sleep' to 'powered', the Event Recorder 50 initializes all event datasets to zero at a first step 52.

Thereafter, the Event Recorder 50 runs three concurrent execution threads 54, 56 and 58. Thread 54 buffers information so that it can be collected for the pre-event data. Thread 56 monitors the image processor 14 for the issuance of an LDW or FCA alert, in which case the probability event and contemporaneous event data is recorded, the post-event information is collected and stored, and the pre-event information is transferred from the buffer. Thread 58 periodically updates histograms and counters, as discussed in greater detail below.

Thread 54 includes a pre-event buffering process 60, which is shown in detail in FIG. 4. The buffering process 60 utilizes a memory buffer divided into two segments 30M1 and 30M2 (FIG. 1). A buffer pointer BP indicates the older of the two buffers segments 30M1, 30M2, which is also the next buffer segment to be overwritten. The buffer segments 30M1 and 30M2 are preferably of the same size and sized large enough to hold three seconds of pre-event data that is generated by the CAN 20. The buffering process 60 operates in round-robin fashion as follows: initially, at step 60A, the BP is set to the second buffer segment 30M2 and for the next three seconds the process 60 monitors the CAN bus 20 for any pre-event data and writes the pre-event data to the first buffer segment 30M1. After three seconds have elapsed, control passes to step 60B where the BP is set to the first buffer segment 30M1 and for the next three seconds the process 60 monitors the CAN bus 20 for any pre-event data and writes the pre-event data to the second buffer segment 30M2. After three seconds have elapsed, control passes back to step 60A to repeat the process.

Those skilled in the art will appreciate that the size and corresponding recording times of each buffer segment may be varied and that the number of buffer segments may also be varied, while remaining within the spirit and scope of the present invention.

The pre-event data preferably includes the following information obtained from the CAN bus 20:

| Signal | Type | Comments |
|---|---|---|
| Time | Time | |
| GPS Coordinates | Coordinate | |
| GPS Heading | Coordinate | |
| Forward collision alert gap setting | Set | off, near, medium, far |
| Adaptive cruise control active | Boolean | |
| Cruise control active | Boolean | |
| ABS active | Boolean | Is antilock braking system active? |
| ESC active | Boolean | Is electronic stability control system active? |
| Windshield wiper active | Boolean | Is windshield wiper active? |
| Vehicle Speed | Integer | |
| Accelerator Position | Percentage | |
| Vehicle acceleration | Numerical | |
| Vehicle lateral acceleration | Numerical | |
| Yaw rate | Numerical | |
| Brake pedal position | Percentage | |
| Turn signal status | Set | No, right, left |

The pre-event data preferably also includes the following information obtained from the image processor 14:

| | | |
|---|---|---|
| FCA state | Set | $00 = No alert<br>$01 = Alert level 1<br>$02 = Alert level 2 (headway)<br>$03 = Alert level 3 (imminent collision) |
| Range to target | Numerical | |
| Target vehicle speed | Numerical | |
| Target vehicle acceleration | Numerical | |
| Target vehicle azimuth | Numerical | |
| Target moveable? | Boolean | |
| Target type (motorcycle, etc.) | Set | Car, truck, motorcycle |
| LDW state | Set | $00 = Off, $01 = Left, $02 = Right |
| Position in lane, left | Integer | |
| Position in lane, right | Integer | |
| Lane-tracking confidence, left | Set | Low, medium, high |
| Lane-tracking confidence, right | Set | Low, medium, high |
| Camera-inferred road curvature, left | Boolean | |
| Camera-inferred road curvature, right | Boolean | |

Referring now to thread 56 in FIG. 3, at a first step 70 the Event Recorder monitors the image processor 14 for receipt of an LDW or FCA warning.

The Event Recorder 50 will preferably store an LDW dataset 42, irrespective of whether or not the LDW function is turned on, off, or disabled. Note, however, that the Event Recorder 50 will not store an LDW dataset if the LDW warning is inhibited because the turn signal is on so as to not record valid lane changes. Likewise, the Event Recorder 50 will preferably store an FCA dataset 44, irrespective of whether or not the FCA function is turned on, off, or disabled. Note, however, that the Event Recorder 50 will not store an FCA dataset if the FCA warning is inhibited because the brake pedal has been depressed.

At step 72, the Event Recorder 50 determines the storage location for the probability event within the data collection 40, depending on the type of probability event. In the illustrated embodiment, the Event Recorder maintains a history of 5 LDW datasets, overwriting the oldest dataset if more than 5 lane departure probability events occur after a power on transition, as illustrated in FIG. 5. Likewise, the Event Recorder maintains a history of 3 FCA datasets, overwriting the oldest dataset if more than 3 forward collision probability events occur after a power on transition, such as illustrated in FIG. 6.

At step 74 in FIG. 3, the Event Recorder 50 copies pre-event data from the buffer segment 30M1 or 30M2 pointed to by the buffer pointer BP into the pre-event area 42a or 44a of the dataset location identified in step 72. It should be appreciated that by utilizing the segmented buffers, the pre-event data of the preferred embodiment is known to be between zero and six seconds old. For example, if a probability event is detected just as the second buffer segment starts its time period, the pre-event data transferred from the first buffer will be between zero to three seconds old. If the probability event is detected just as the second buffer segment reaches the end of its time period, the pre-event data transferred from the first buffer will be between three to six seconds old. Thus, this technique ensures that a consistent window of pre-event data is always available for recordation at any time, which would not be the case if a single buffer was utilized that needs to be periodically overwritten and thus may not guarantee an adequate snapshot of the vehicle signals.

At step 76, the Event Recorder 50 writes event data into the contemporaneous event area 42b or 44b (FIG. 2) of the dataset location identified in step 72. The contemporaneous event data preferably includes the following information obtained from the CAN bus 20:

| Signal | Type | Comments |
| --- | --- | --- |
| Time | Time | |
| GPS Coordinates | Coordinate | |
| GPS Heading | Coordinate | |
| Forward collision alert gap setting | Set | off, near, medium, far |
| Adaptive cruise control active | Boolean | |
| Cruise control active | Boolean | |
| ABS active | Boolean | Is antilock braking system active? |
| ESC active | Boolean | Is electronic stability control system active? |
| Windshield wiper active | Boolean | Is windshield wiper active? |
| Vehicle Speed | Integer | |
| Accelerator Position | Percentage | |
| Vehicle acceleration | Numerical | |
| Vehicle lateral acceleration | Numerical | |
| Yaw rate | Numerical | |
| Brake pedal position | Percentage | |
| Turn signal status | Set | No, right, left |

And the following information obtained from the image processor 14:

| | | |
| --- | --- | --- |
| FCA state | Set | $00 = No alert<br>$01 = Alert level 1<br>$02 = Alert level 2 (headway)<br>$03 = Alert level 3 (imminent collision) |
| Range to target | Numerical | |
| Target vehicle speed | Numerical | |
| Target vehicle acceleration | Numerical | |
| Target vehicle azimuth | Numerical | |
| Target moveable? | Boolean | |
| Target type (motorcycle, etc.) | Set | Car, truck, motorcycle |
| LDW state | Set | $00 = Off, $01 = Left, $02 = Right |
| Position in lane, left | Integer | |
| Position in lane, right | Integer | |
| Lane-tracking confidence, left | Set | Low, medium, high |
| Lane-tracking confidence, right | Set | Low, medium, high |
| Camera-inferred road curvature, left | Boolean | |
| Camera-inferred road curvature, right | Boolean | |

At step 78 in FIG. 3, the Event Recorder 50 monitors certain variables and CAN signals for four (4) seconds after a probability event. Note that unlike the process of collecting pre-event and contemporaneous event data, the process of collecting the post-event data includes, for certain signals, monitoring the signal to determine its maximum or minimum value over the four second post-event interval.

The post-event data optionally and preferably includes the following information obtained from the CAN bus 20, pursuant to the indicated post-event processing function:

| Signal | Type | Function |
| --- | --- | --- |
| Adaptive cruise control active | Boolean | Collect 4 seconds after event |
| Cruise control active | Boolean | Collect 4 seconds after event |
| ABS active | Boolean | Maximum |
| ESC active | Boolean | Maximum |
| Brake Reguest | Boolean | Maximum |
| Vehicle Speed | Integer | Collect 4 seconds after event |
| Accelerator Position | Percentage | Collect 4 seconds after event |
| Vehicle acceleration | Numerical | Collect 4 seconds after event |
| Vehicle acceleration | Numerical | Maximum |
| Vehicle lateral acceleration | Numerical | Collect 4 seconds after event |
| Vehicle lateral acceleration | Numerical | Maximum |
| Yaw rate | Numerical | Collect 4 seconds after event |
| Yaw rate | Numerical | Maximum |
| Yaw rate | Numerical | Minimum |
| Brake pedal position | Percentage | Maximum |
| Brake switch active | Boolean | Maximum |
| Time Brake is activated | Time | Value of timer from first occurrence of Brake Switch On |
| Turn signal status | Set | Collect 4 seconds after event |
| Air Bag Deployment | Set | Maximum, where set defined as:<br>$0 = No Event<br>$1 = Near Deployment Event<br>$2 = Pretensioner Deployment Event<br>$3 = Airbag Deployment Event |

| | | |
| --- | --- | --- |
| FCA state | Set | Maximum |
| Range to target | Numerical | Collect 4 seconds after event |
| Target vehicle speed | Numerical | Collect 4 seconds after event |
| Target vehicle acceleration | Numerical | Collect 4 seconds after event |
| Target vehicle azimuth | Numerical | Collect 4 seconds after event |
| Target moveable? | Boolean | Collect 4 seconds after event |
| Target type (motorcycle, etc.) | Set | Collect 4 seconds after event |
| LDW state | Set | Collect 4 seconds after event |
| Position in lane, left | Integer | Collect 4 seconds after event |
| Position in lane, right | Integer | Collect 4 seconds after event |
| Lane-tracking confidence, left | Set | Collect 4 seconds after event |
| Lane-tracking confidence, right | Set | Collect 4 seconds after event |

Note that in the above, the Boolean value for 'true' is 1, so the maximum function will return 1 if the Boolean signal becomes 'true' at any time in the four seconds after the event. Also, because data received over the CAN bus 20 is asynchronous, the notation 'collect 4 seconds after the event' indicates that the most recent value of the variable four seconds after the event should be recorded.

At step 80 in FIG. 3, the Event Recorder writes the post-event data obtained in step 78 into the post-event area 42c or 44c (FIG. 2) of the dataset location identified in step 72.

At step 82, the Event Recorder 50 updates the appropriate LDW or FCA event counter shown in FIG. 5 or 6.

Figures 7, 8:
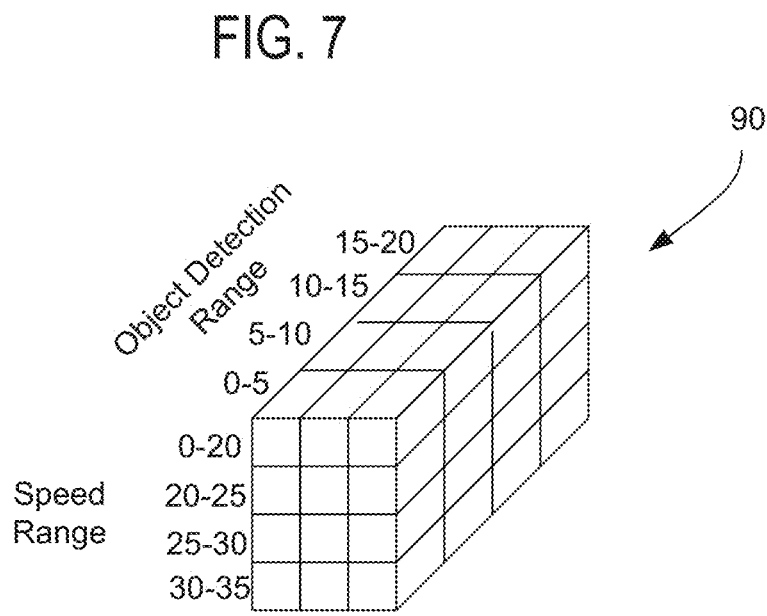
FIGS. 7 and 8 are examples of histograms.

Referring now to thread 58 in FIG. 3, the TSADD 30 includes a process for periodically updating histograms and counters that are stored in the third set 46 of the data collection 40. An example of a histogram is shown by table 88 in FIG. 7. The table 88 correlates a vehicle speed range in circumstances where (i) the image processor has not detected an object; (ii) the image processor has detected an object. Another example of a histogram is shown by the three-dimensional table 90 shown in FIG. 8, which correlates vehicle speed range with ranges of object detection distances (in circumstances where the image processor detects an object). The histogram and counter updating process updates the tables 88 and 90 on a periodic basis, for example, every one second. In these examples, the process 60 monitors the vehicle speed and determines the image processor has detected an object, and if so, the range to the object, and increments the appropriate cell.

The preferred embodiment maintains similar histograms for vehicle speed range correlated to: (a) cruise control being turned on, (b) windshield wiper being active, (c) the number of vehicles detected by the image processor, (d) the right marking confidence level, (e) the left marking confidence level, (f) left distances to lane markings and (g) right distances to lane markings. A variety of other histograms may be tracked as will be appreciated by those skilled in the art.

The histogram and counter updating process also periodically increments the following variables each time the corresponding event occurs: LDW left alert; LDW right alert; and variables that keep track of various reasons why the LDW function is inhibited.

In the foregoing, the images obtained from the camera were not stored as part of the event dataset 40, but in alternate embodiments the pre-event, contemporaneous event and post-event snapshots may be stored in the appropriate dataset.

The Trip Statistics and Alert Data Download (TSADD) feature of the present invention collects and records data around the time of an event of interest. The collected data is generated internally in the camera (such as, for example, CIPV object information) and information received on the CAN bus (such as, for example, GPS coordinates). The TSADD makes the data available to be read using a diagnostic DID from the telematics module (such as ONSTAR®), between others. The goal of collecting event data around LDW, FCA and CIB alerts is to investigate the effectiveness of LDW, FCA and CIB systems through statistical post-processing of event data collected from many vehicles through the vehicle telematics system.

The TSADD feature utilizes camera diagnostic data that is intended for internal camera development and troubleshooting. It is understood that diagnostic data may not be validated to the same rigorous standard as functional messages, such as, for example, FDI messages that are displayed to the driver.

Figure 9:
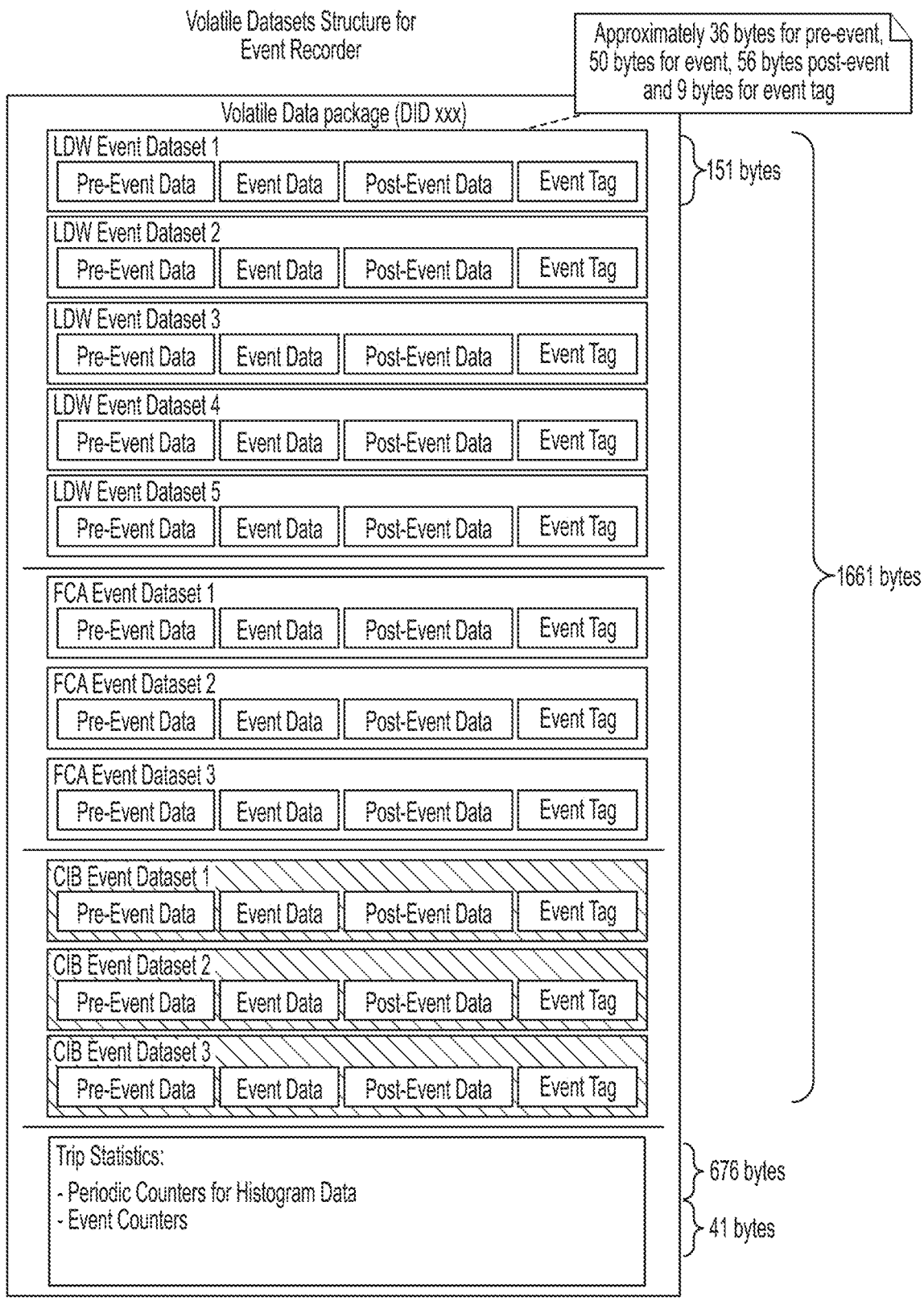
FIG. 9 is a block diagram of another data collection format.
Figure 10:
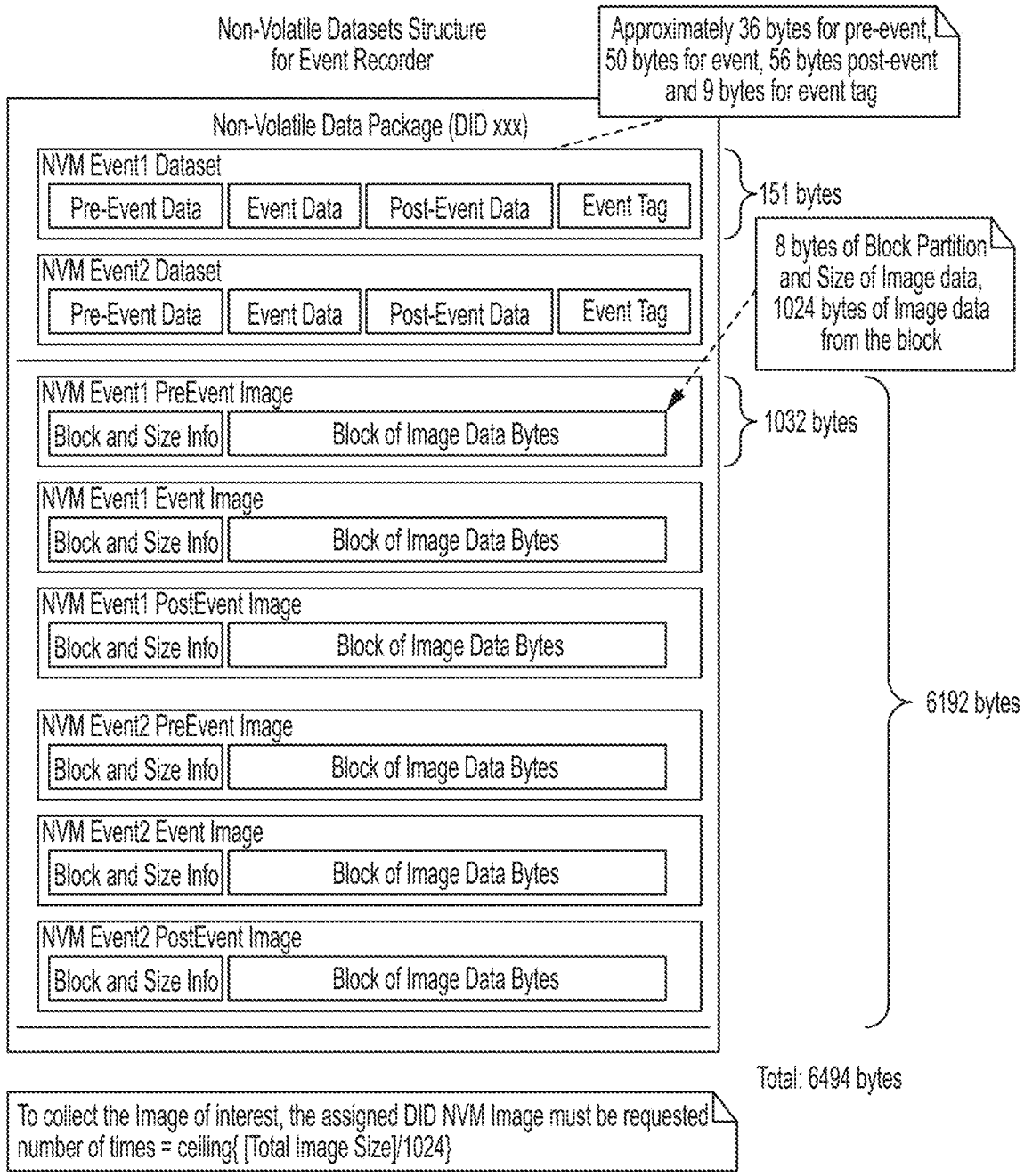
FIG. 10 is a flowchart of another event recorder algorithm.

The data to be collected within a TSADD feature (Volatile) of the present invention is shown in FIG. 9. The diagram shown in FIG. 9 is split in several DIDs, for efficiency. The data to be collected within the Trip Statistics and Alert Data Download Feature (Non Volatile) is shown in FIG. 10. The diagram shown in FIG. 10 is also split in several DIDs, for efficiency.

Figure 11:
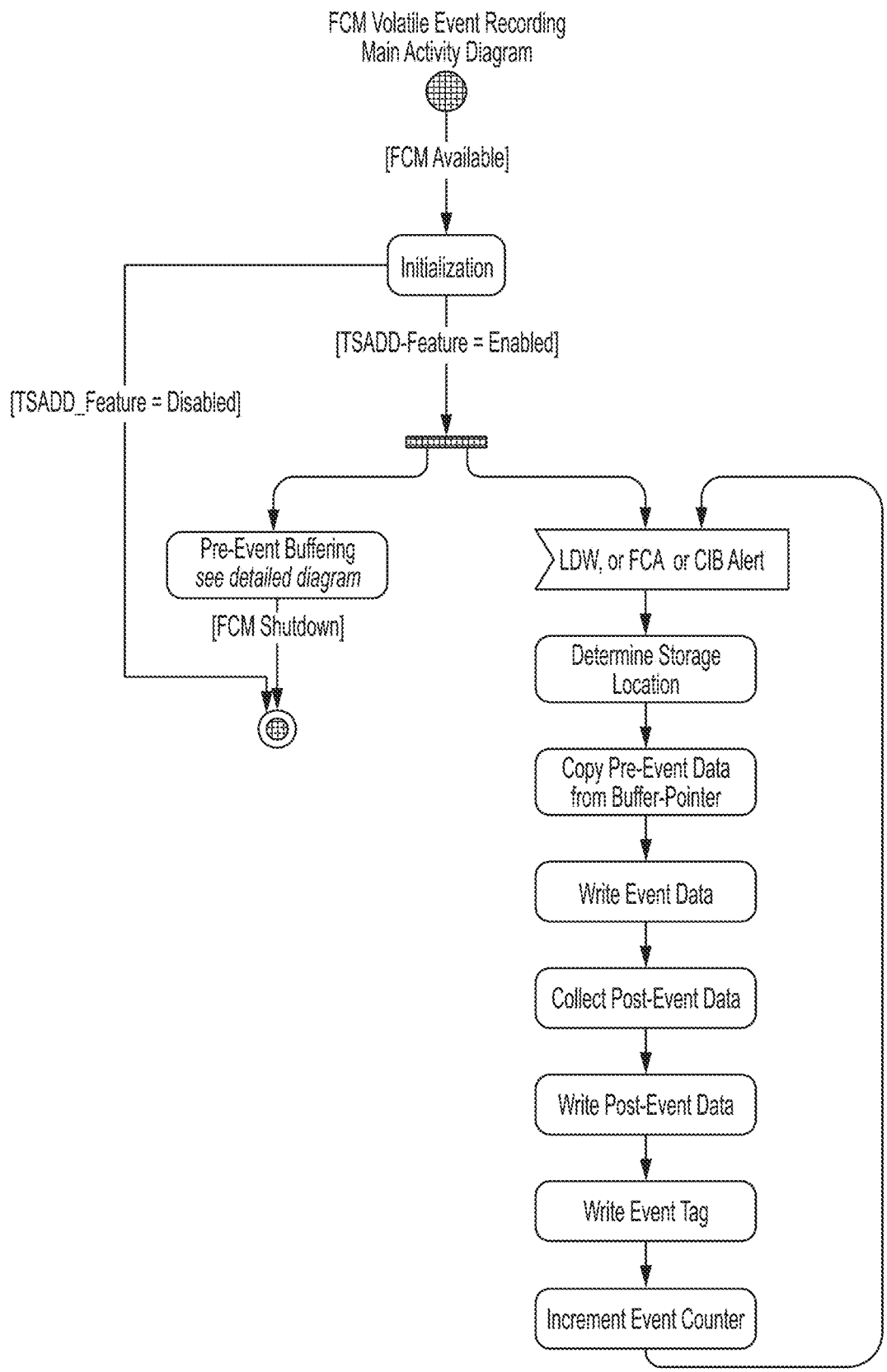
FIGS. 11-13 are examples of histograms.

The FCM may implement the Event Data Collection as illustrated in the activity diagram of FIG. 11 (the process of FIG. 11 is similar to that shown in FIG. 3, but includes a crash imminent braking (CIB) alert and the "write event tag" step). All event data storage variables that are referred to herein shall be initialized with 0 when (1) the FCM Operating Status changes from FCM Sleep to FCM Available (i.e. upon Power On Reset), and/or (2) the LSCANRX_SysP-wrMd transitions from !Run to Run value.

If the calibration value TSADD_Feature is set to Enabled, then the Event Data Collection feature shall be enabled. If the calibration value TSADD_Feature is set to Disabled, then the Event Data Collection shall be disabled.

The FCM module shall implement a pre-event buffer in RAM. The pre-event buffer comprises two storage locations, which shall be alternately populated with a pre-event dataset as defined in FIG. 4.

An LDW, FCA or CIB event dataset set shall consist of (i) pre-event data, event data, post-event data and event tag. When the conditions for an LDW alert are detected, the FCM shall store an LDW dataset, irrespective of whether LDW is on, off, or disabled. Note that an LDW dataset will be stored even if the driver has disabled the LDW warning, an LDW dataset will only be stored if the FCM has the LDW feature (in other words, a part that doesn't include LDW will not record LDW datasets), and/or an LDW dataset will not be stored if the LDW warning is inhibited, such as, for example, because the turn signal is on (in order to not record valid lane changes).

The FCA event shall be monitored when the FCA or PEDs feature is/are enabled. If these conditions are satisfied, the FCM shall store an FCA event dataset. In the event that the pedestrian warning is generated in less than 4 seconds after a forward collision alert, the pedestrian warning shall take precedence towards storing it in the FCA event dataset. The driver-selected FCA alert timing (far/medium/near) shall apply to the storage of FCA event dataset. Note that (i) an FCA dataset will be stored even if the driver has disabled the FCA warning, (ii) an FCA dataset will only be stored if the FCM has the FCA feature (i.e. a part that doesn't include FCA will not record FCA datasets), (iii) an FCA dataset will not be stored if the FCA warning is inhibited, such as, for example, because the brake pedal has been depressed, and/or (iv) an FCA dataset will not be stored in case of headway alerts. If the driver has disabled FCA alerts by selecting Forward Collision Alert Gap Setting "Off", the FCA dataset shall be recorded using "far" alert timing.

The CIB event shall be monitored if the low speed collision mitigation by braking (LSCMB) feature is enabled or the PEDs feature is enabled. If these conditions are satisfied, the FCM shall store a CIB event dataset. Note that a process may be used to trigger a Brake Prefill feature at the LSCMB. However, the system has the properties to function appropriately should a full Automatic Braking event occur at higher speeds. The monitoring of this signal will allow for collection of relevant data about performance of Collision Imminent Braking for future development. The reading of the CIB dataset information itself will be enough to determine if actual automatic braking occurred or not.

Figure 12:
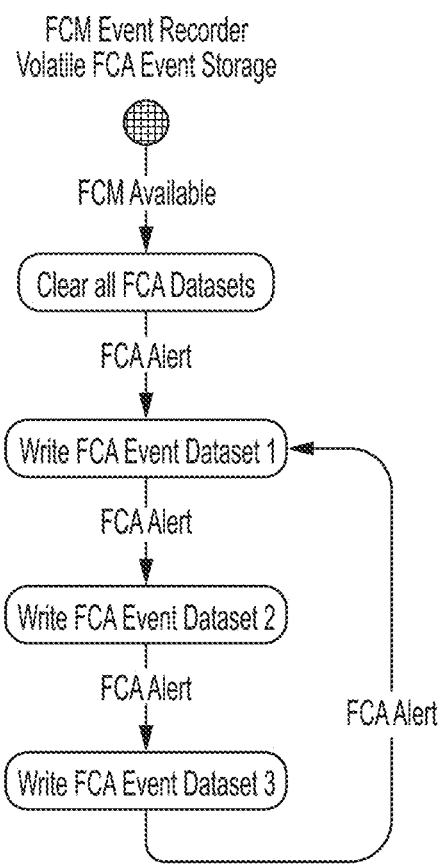
Figure 13:
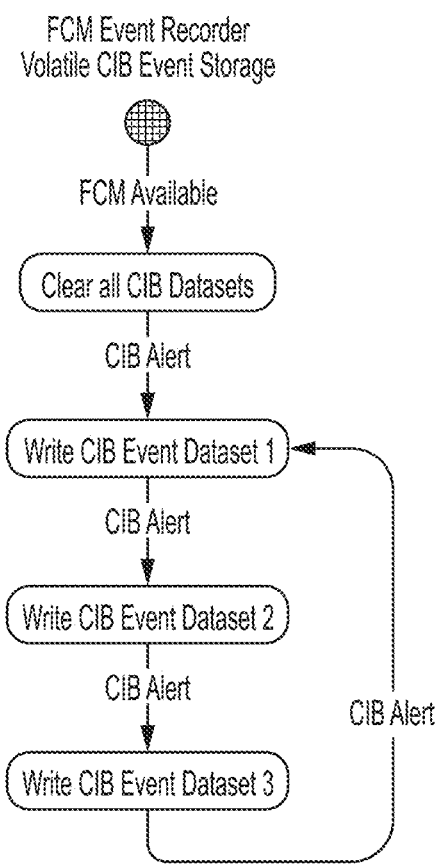

As shown in FIGS. 2 and 9, the FCM may maintain a history of 5 LDW event datasets, overwriting the oldest dataset if more than 5 LDW events occur after a Powermode Sleep→Available transition (see FIG. 5). The FCM shall maintain a history of 3 FCA event datasets (FIGS. 2 and 9), overwriting the oldest dataset if more than 3 FCA events occur after of Powermode Sleep→Available transition (see FIG. 12). The FCM shall maintain a history of 3 CIB event datasets (FIG. 9), overwriting the oldest dataset if more than 3 CIB events occur after of Powermode Sleep→Available transition (see FIG. 13).

In the step of Copying Pre-Event Data from Buffer-Pointer in FIG. 11, the FCM may copy pre-event data from the buffer pointer into the storage location identified in the step "determine storage location". Note that the Buffer-Pointer is always pointing to the older of the two buffer values, which is also the next buffer value to be overwritten.

In the step of writing event data in FIG. 11, the FCM writes event data into the storage location identified in the step "determine storage location".

For about 4 seconds after an event, the FCM shall monitor certain variables and CAN signals and write a post-event dataset into the storage location identified in the step "determine storage location" in FIG. 11. If a function is specified (for example, max ( ) or min ( ), the function shall be applied to all values received by the FCM within 4 seconds after the event. The notation @t=4 sec indicates that the most recent value of the variable 4 seconds after the event shall be used.

Post-Event data collected per requirements above shall be stored for retrieval in volatile memory.

In the write event tag step in FIG. 11, the FCM shall write event tag into the storage location identified in the step "determine storage location".

After each LDW event, an LDW event counter shall be incremented to determine the storage location for the following LDW alert data.

After each FCA event, an FCA event counter shall be incremented to determine the storage location for the following FCA alert data. After each CIB event, a CIB event counter shall be incremented to determine the storage location for the following CIB alert data.

The FCM collects trip statistics by periodically incrementing counter values. Counter variables, the rate at which they are incremented, and the guard conditions under which they are incremented may be established via any suitable means. All guard conditions in a row are to be logically AND connected. Note that, since vehicle speed may be received in km/h on the vehicle CAN bus, but trip statistics may be collected relative to speed in mph, the FCM may have to convert the vehicle speed internally for purpose of collecting trip statistics. Also, although each counter was designed in size enough to keep counts during a typical driving session, each of them will rollover when exceeding its maximum capable count.

All trip statistics variables shall be initialized with 0 when the FCM Operating Status changes from FCM Sleep to FCM Powered (i.e. upon Power On Reset).

The FCM shall increment variables each time the corresponding event occurs. Note that, although each counter was designed in size enough to keep counts during a typical driving session, each of them will rollover when exceeding its maximum capable count.

The FCM may be capable of storing images as well as data in Non-Volatile Memory of an Event of Interest. This feature is known as Non-Volatile Memory Storage, or NVM Storage. In general, the NVM feature shall comprise (a) two Stored Events, each Stored Event comprising (i) one Dataset that contains PreEvent, Event, PostEvent and Event Tag and (ii) three Images: PreEvent, Event and PostEvent each, (b) events of Interest to be monitored for potential storage, (c) configuration to enable or disable thru calibration and (d) methods for Data Retrieval.

The following table enlists the Events of Interest to be monitored by the FCM, towards the NVM feature:

| Event Which Triggers Storage of Data | Priority (15 is highest) | Event Type Enumeration for Storage Cell (hex value) | Signal to use | |
|---|---|---|---|---|
| Airbag Deploy | 13 | 0D | LSCANRX_Airbag_Impact_Data - Notification Event Status: Airbag Deployment Event | Use signal Airbag_Impact_Data - Notification Event Counter to determine if event is new |
| Pretensioner Deploy | 11 | 0B | LSCANRX_Airbag_Impact_Data - Notification Event Status: Pretensioner Deployment Event | Use signal Airbag_Impact_Data - Notification Event Counter to determine if event is new |
| Airbag Near Deploy | 9 | 09 | LSCANRX_Airbag_Impact_Data - Notification Event Status: Near Deployment Event | Use signal Airbag_Impact_Data - Notification Event Counter to determine if event is new |
| Pedestrian Braking | 8 | 08 | IF (PEDs_Feature == Enabled) THEN monitor for the transition from FALSE to TRUE of M_PED_WRN_1 signal | FCM_LS internal signal |
| CIB | 7 | 07 | IF (LSCMB_Feature == Enabled) {THEN (Monitor for the transition from FALSE to TRUE of bM_CIB_WRN_1 signal) AND (LSCANRX_VehSpdAvgDrvn <= 60 KPH)//Used for Imminent Braking -OR- THEN (Monitor for the transition from FALSE to TRUE of bM_CIB_WRN_3 signal) AND (LSCANRX_VehSpdAvgDrvn > 60 KPH)//Used for Brake Prefill} | FCM_LS internal signals |
| Pedestrian Warning | 6 | 06 | IF (PEDs_Feature == Enabled) THEN monitor for the transition from FALSE to TRUE of M_PED_WRN_2 signal | FCM_LS internal signal |
| FCA | 5 | 05 | UARTRX_alertWarningIndication Request signal transitions to "Alert Level 3" value | FCM_LS internal signal |
| LDW | 3 | 03 | UARTRX_laneDepWarningLocation != OFF | FCM_LS internal signal |

The FCM shall save into the NVM Storage an Event of Interest if its priority is higher than the lowest priority dataset of the NVM Stored events. If the Event of Interest has a priority equal to one or more of the NVM Stored events, the FCM shall save the event of interest over the Stored event whose Event Tag time is the oldest, between those same-priority NVM Stored ones.

If the calibration value NVM Storage Feature is set to Enabled, then the NVM Storage Feature shall be enabled. If the calibration value NVM Storage Feature is set to Disabled, then the NVM Storage Feature shall be disabled. If a calibration value K_NVM_LDW_Event is set to FALSE, then the NVM Storage for LDW Event shall be disabled. If the calibration value K_NVM_LDW_Event is set to TRUE, then the NVM Storage for LDW Event shall be enabled. If a calibration value K_NVM_FCA_Event is set to FALSE, then the NVM Storage for FCA Event shall be disabled. If the calibration value K_NVM_FCA_Event is set to TRUE, then the NVM Storage for FCA Event shall be enabled. If a calibration value K_NVM_PedWarning_Event is set to FALSE, then the NVM Storage for Pedestrian Warning Event shall be disabled. If the calibration value K_NVM_PedWarning_Event is set to TRUE, then the NVM Storage for Pedestrian Warning Event shall be enabled. If a calibration value K_NVM_CIB_Event is set to FALSE, then the NVM Storage for CIB Event shall be disabled. If the calibration value K_NVM_CIB_Event is set to TRUE, then the NVM Storage for CIB Event shall be enabled. If a calibration value K_NVM_PedBraking_Event is set to FALSE, then the NVM Storage for Pedestrian Braking Event shall be disabled. If the calibration value K_NVM_PedBraking_Event is set to TRUE, then the NVM Storage for Pedestrian Braking Event shall be enabled. If a calibration value K_NVM_AirbagNearDeploy_Event is set to FALSE, then the NVM Storage for Airbag Near Deploy Event shall be disabled. If the calibration value K_NVM_AirbagNearDeploy_Event is set to TRUE, then the NVM Storage for Airbag Near Deploy Event shall be enabled. If a calibration value K_NVM_AirbagPretDeploy_Event is set to FALSE, then the NVM Storage for Airbag Pretensioner Deploy Event shall be disabled. If the calibration value K_NVM_AirbagPretDeploy_Event is set to TRUE, then the NVM Storage for Airbag Pretensioner Deploy Event shall be enabled. If a calibration value K_NVM_AirbagDeploy_Event is set to FALSE, then the NVM Storage for Airbag Deploy Event shall be disabled. If the calibration value K_NVM_AirbagDeploy_Event is set to TRUE, then the NVM Storage for Airbag Deploy Event shall be enabled.

Figure 14:
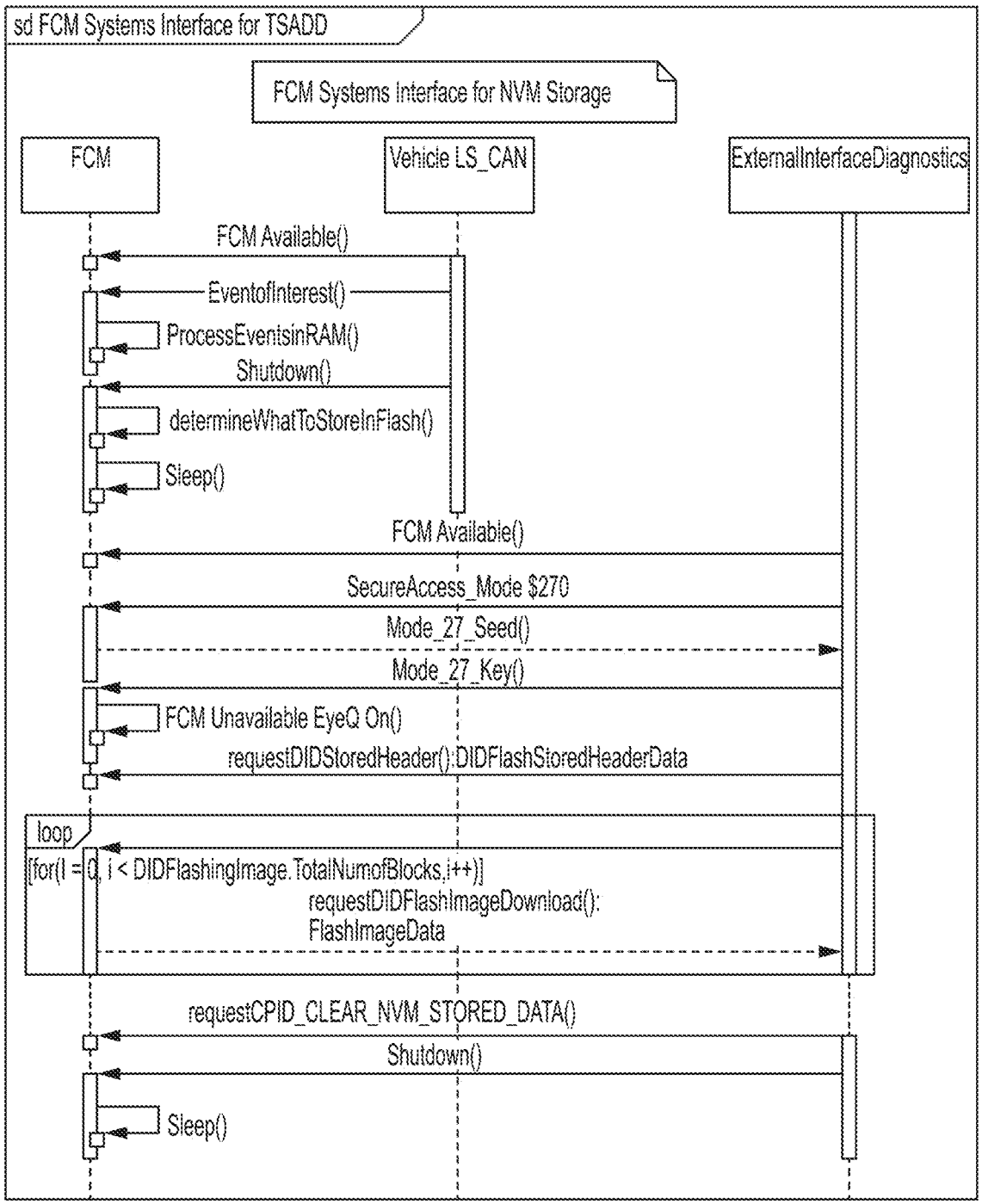
FIG. 14 is a schematic of the FCM system interface.

The NVM Storage Feature shall be enabled only when the Manufacturer's Enable Counter variable M_MEC_Count has a value of $00. The FCM shall implement the NVM Storage Systems Interface as illustrated in the sequence diagram of FIG. 14.

When the FCM transitions to FCM Available power mode, it will monitor for the relevant Event of Interest, and once an Event of Interest occur, the FCM will process the event. When the FCM transitions to Shutdown, the FCM shall determine what to store in Flash (NVM Storage). If Event(s) of Interest is (are) to be saved into NVM Storage, the FCM shall transition from Shutdown into Sleep power mode upon completion of the system requirements but no longer than about 300 seconds.

As an outcome, the FCM will write into NVM Storage the Airbag Deployed Event immediately. If the Event of Interest=LSCANRX_Airbag Deployment Event, then the FCM shall execute the following sequenced actions:

1. Transition to FCM_Unavailable_EyeQ_On power mode;
2. Execute "process events in RAM";
3. Execute "determine what to store in Flash";
4. Finally, transition to FCM Available power mode.

The External Tool will procure that the FCM enters into Available power mode. Next, the External Tool will initiate a mode to secure access, in order to obtain access the NVM Stored Events.

Upon successfully entering the mode to secure access, the FCM shall transition to FCM_Unavailable_EyeQ_On power mode. While in FCM_Unavailable_EyeQ_On power mode, the FCM will not operate the rest of its features as normally. This is done so the NVM access and data transmission processing tasks can be granted.

While in the mode to secure access, if the External Tool sends a CPID CLEAR_NVM_STORED_DATA signal, the FCM shall either:
  a. Respond with Negative response "Conditions Not Correct" if the system requirements are satisfied, OR
  b. Erase the sector dedicated to NVM Storage.

Finally, the External Tool will procure that the FCM enters into Shutdown power mode.

Figure 15:
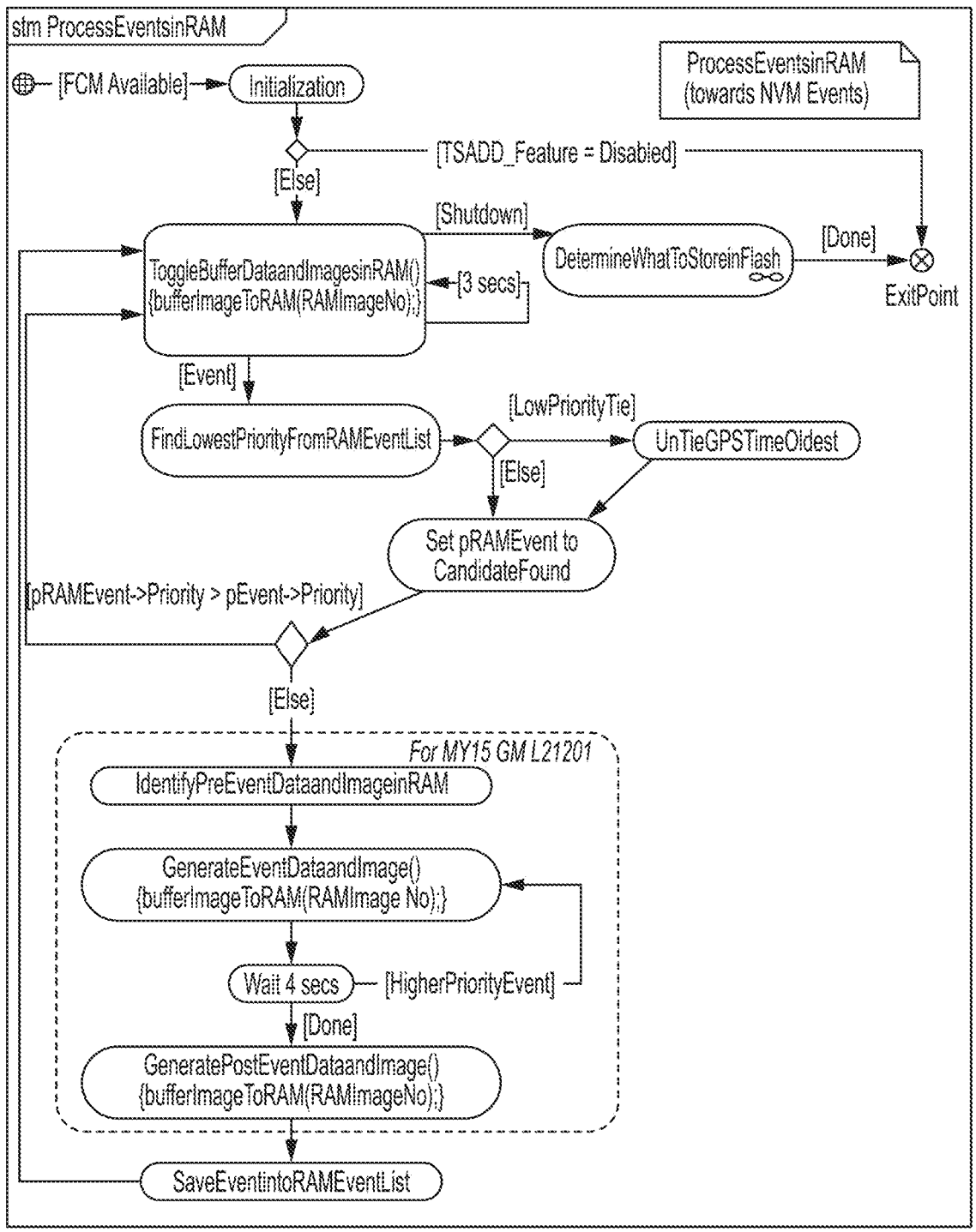
FIG. 15 is a flowchart of the process events in RAM.

The FCM shall Process the Events in RAM, towards the NVM Storage, as illustrated in the activity diagram of FIG. 15. Upon entering the FCM Available power mode, the FCM will initialize the variables and buffers to zeros. The calibration variable TSADD_Feature will be checked to decide to execute or not this algorithm. The FCM then toggles every 3 seconds Images and Data in RAM, which it will help towards generating the Pre-Event Data and Image. The Pre-Event to Event Data/Image "time showing age of this sample" attribute shall be separated by at least about 3 seconds.

Upon occurring an Event of Interest, the FCM will fetch for the lowest priority event from events recorded in RAM previously. This is a provision that allows having multiple occurrence of events of interest during the FCM Available power mode, for which the FCM is interested on saving the most relevant ones. If the priority of such an Event of Interest is greater than or equal that selected from the RAM list, then the FCM will generate the Event and Post Event Data and Images. Finally, the RAM Event List is updated containing the newly Event of Interest in it towards the next cycle. The toggling cycle ends when the FCM transitions to Shutdown power mode, towards "determine what to store in flash" system requirements.

Figure 16:
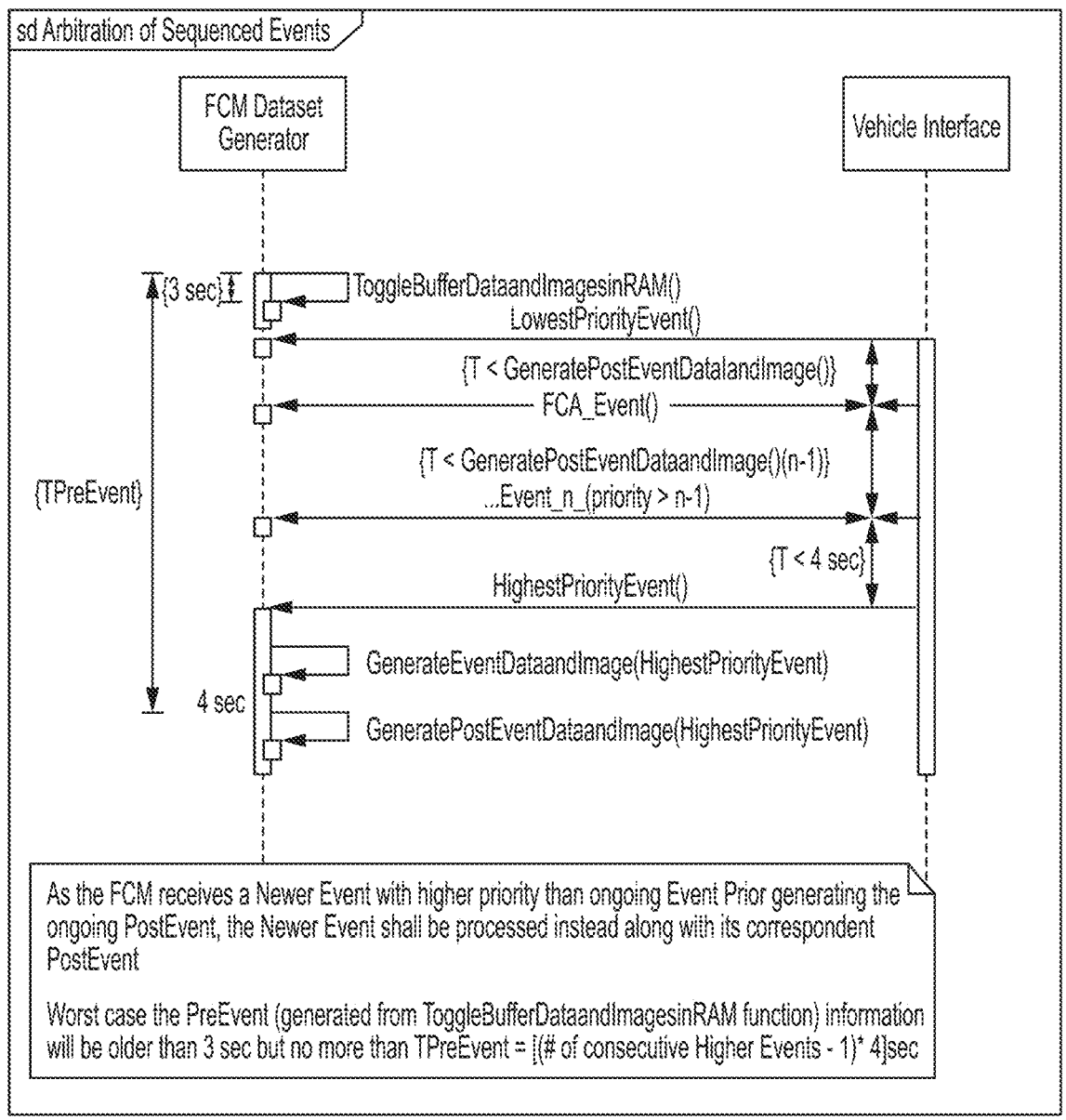
FIG. 16 is a schematic of a hierarchy of sequenced events.

The FCM will handle priority arbitration of events as illustrated in the sequence diagram of FIG. 16. The FCM will determine what to store in Flash (NVM), as illustrated in the activity diagram of FIG. 17.

Upon transitioning to Shutdown, the FCM may not save into NVM Storage if any of these conditions are present:
  1. NVM_Storage_Feature equals to Disabled;
  2. Manufacturer's Enable Counter M_MEC_Count is greater than 00 hex;
  3. No Event of Interest occurred during the FCM Available power moding.

If the conditionals stated above are not fulfilled, the FCM may execute the following steps towards NVM Storage:
  a. Load the Two NVM Stored Datasets from NVM (Flash);
  b. Find the candidate from NVM Stored Dataset location to be potentially replaced by Events of Interest that occurred during FCM Available, in this case the lowest of the priority and if needed, the oldest;

c. Find the candidate Event of Interest that occurred during the FCM Available, with the highest priority, and if needed, the newest, that could potentially replace the currently saved dataset from NVM;
d. Compare b and c. If c>=b, then proceed to save the Event of Interest into the NVM Storage location, Data and Images;
e. Do this comparison for each of the (Two) NVM Stored locations;
f. Transition to FCM Sleep when done.

Figure 17:
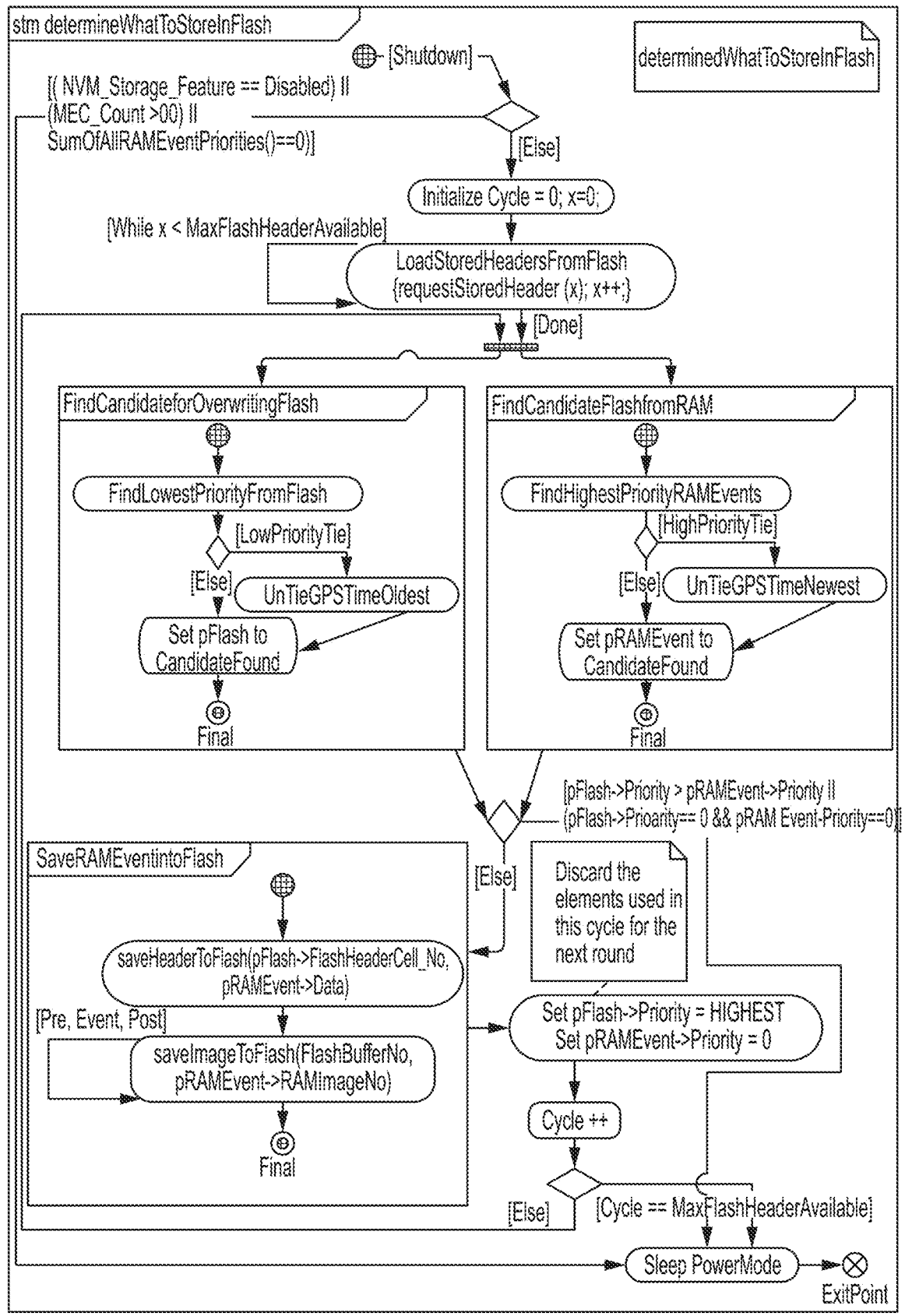
FIG. 17 is a flowchart of the process of determining what to store.
Figure 18:
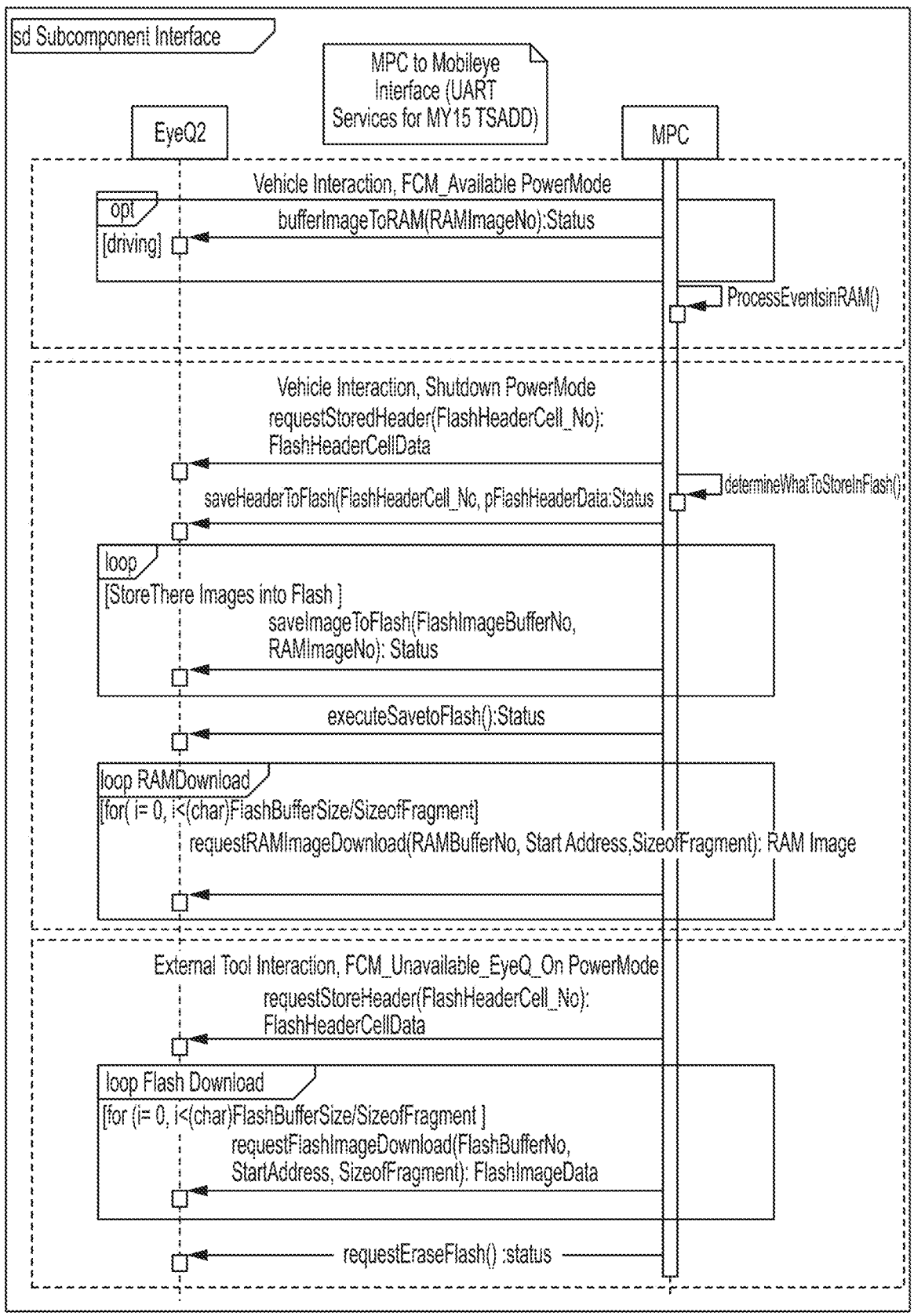
FIG. 18 is a schematic of the image processor and MPC.

The FCM shall implement the UART Systems Interface as illustrated in the sequence diagram of FIG. 17.

An objective of a "buffer image to RAM" process of the system of the present invention is to provide the ability to determine when and where to save an image in a RAM location for TSADD purpose. The input may provide a Pseudo location that indicates where to store the RAM Image, with possible values from 0 to 8 (9 locations Total), and the returned output may be 0 if success, ERROR otherwise.

An objective of a "request stored header" process of the system of the present invention is to retrieve the previously stored header data information from a particular event of interest. The input may provide a pseudo location that indicates from where to retrieve the header information out of the TSADD Flash structure, with possible values from 0 to 5 (6 locations Total), and the returned output may be a stream of 255 bytes of data that corresponds to the requested allocated header information.

An objective of a "save header to flash" process of the system of the present invention is to save into the requested pseudo allocation of TSADD Flash the stream of data. The input may provide a pseudo location that indicates where to save the header information, for later retrieval, with possible values from 0 to 5 (6 locations Total), and a stream of 255 bytes of data, and the returned output may be 0 if success, ERROR otherwise.

An objective of a "save image to flash" process of the system of the present invention is to save into the requested pseudo allocation of TSADD Flash the Image. An input may be a pseudo location that indicates where to save the Image into the Flash sector, for later retrieval, with possible values from 0 to 5 (6 locations Total), and a pseudo location that indicates the location of the RAM Image to be saved into Flash, with possible values from 0 to 8 (9 locations Total), and the returned output may be 0 if success, ERROR otherwise.

An objective of an "execute save to flash" process of the system of the present invention is to trigger the Flashing process, so that the EYEQ2 processor makes the necessary memory management in an efficient manner. The Header(s) or Image(s) that are to be saved by the subcomponent shall not disturb the data integrity of the allocations (headers and images) not instructed to be overwritten by the MPC. There may be no input to this process and the returned output may be 0 if success, ERROR otherwise.

An objective of a "request RAM image download" process of the system of the present invention is to retrieve the previously stored Image data from TSADD RAM from a particular event of interest. This service is a preparation for architectures where external Flash locations may be added. An input may be a pseudo location that indicates from where to retrieve the Image out of the TSADD RAM structure, with possible values from 0 to 8 (9 locations Total), a start address offset of the Image to be retrieved, and the size of image data bytes to be transmitted, and the returned output may be a stream of Image data bytes, with the stream size as indicated by the input, that corresponds to the requested allocated Image from TSADD RAM.

An objective of a "request flash image download" process of the system of the present invention is to retrieve the previously stored Image data from TSADD Flash from a particular event of interest. An input may be a pseudo location that indicates from where to retrieve the Image out of the TSADD Flash structure, with possible values from 0 to 5 (6 locations Total), a start address offset of the Image to be retrieved, and the size of image data bytes to be transmitted, and the returned output may be a stream of Image data bytes, with stream size as indicated by the input, that corresponds to the requested allocated Image from TSADD Flash.

An objective of a "request erase flash" process of the system of the present invention is to erase (fill with FFs) the complete TSADD-dedicated Flash Sector. There may be no input and a returned output may be 0 if success, ERROR otherwise.

Figure 19:
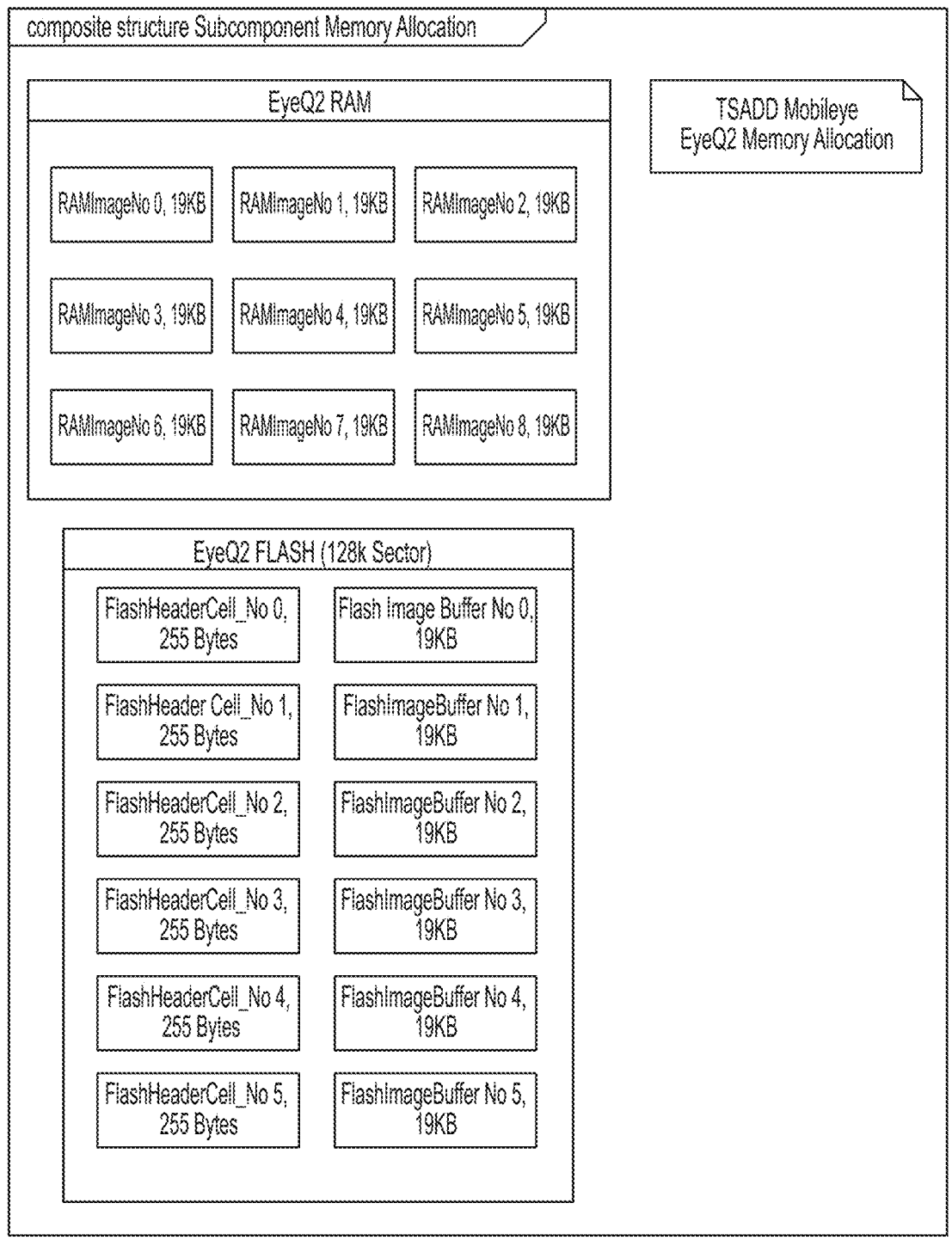
FIG. 19 is a block diagram of the memory allocation by the system of the present invention.

The Subcomponent shall allocate the RAM and Flash towards the NVM Storage feature as shown in the composite diagram of FIG. 19.

Unless specified in the particular data otherwise, whenever there is absence of information related to such data, or its entire dataset (including image datasets), the FCM shall report the default value(s) as 00 hex.

Event Data and Trip Statistics data shall be maintained while the FCM module is in the FCM Available State. The data need not be maintained after the FCM goes to sleep following VN deactivation or after the unlikely event of a hardware reset.

The FCM shall allow the stored data to be read using LAN physical messages. A Security Access Service mode may be used to enable Stored Data Transmission and Stored Data Clearing. The security access scheme shall be as follows: the FCM shall create a random 16-bit non-zero and non-$FFFF number as its seed. The calculation of the key shall be the 1's complement of the seed value. The FCM shall use a Sub-function Parameter for the RequestSeed. The FCM shall use the Sub-function Parameter for the SendKey.

Figure 20:
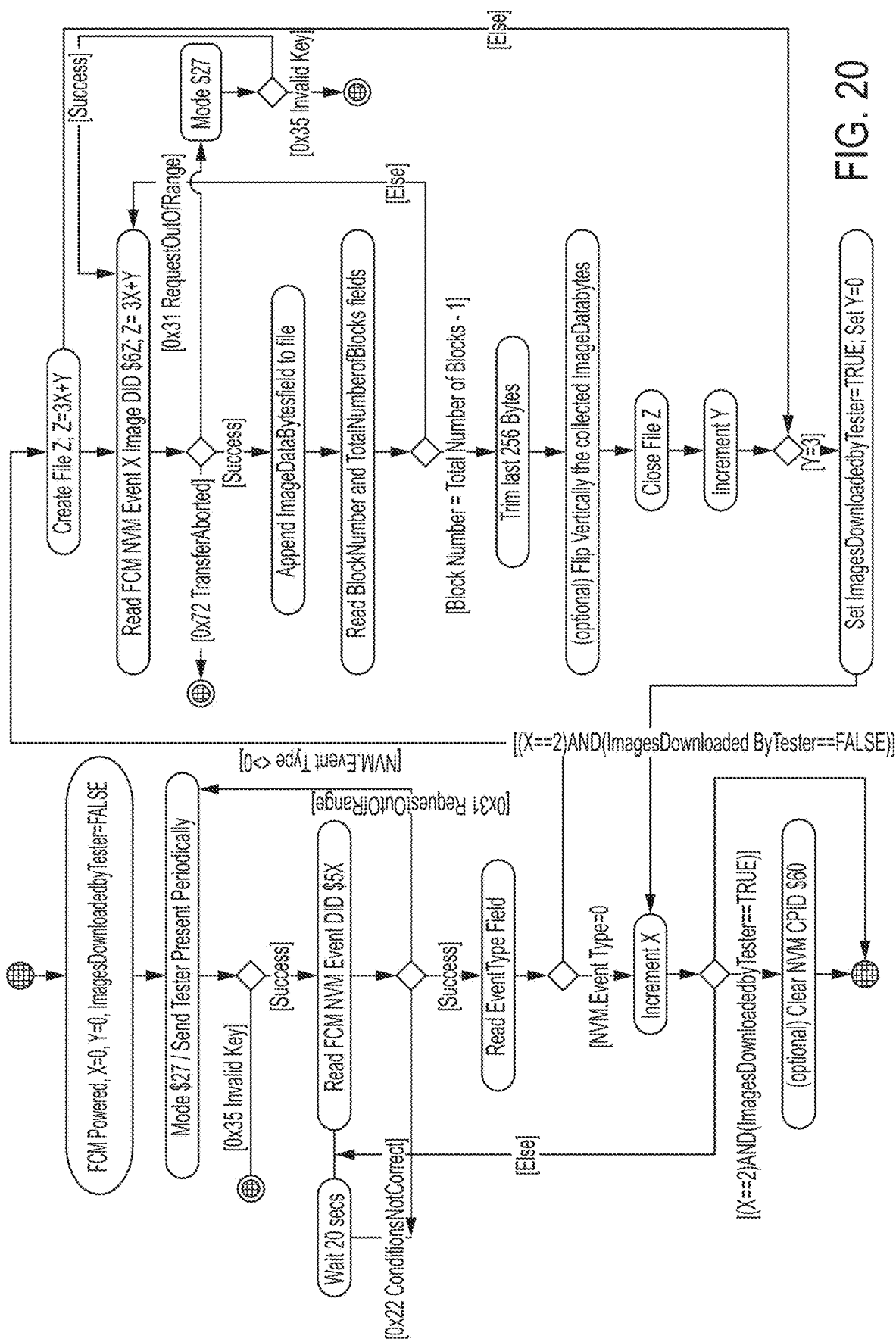
FIG. 20 is a flowchart showing the strategy for the external tool to extract Images.

The flow diagram of FIG. 20 describes the strategy for the External Tool to extract Images.

While in the access mode, to download an image, the External Tool must perform the following actions:
1. Prior image downloading, the External Tool should request the correspondent FCM NVM Event "X" Dataset first and observe for its Type of Event field. If such is equal to 00 hex, then the Event's image data is blank (filled with 00s), thus the image downloading step could be skipped by the External Tool.
2. The External Tool may create a file with extension *.PGM
3. Edit the file created to add the following data to the start of the file: "P5\n160 120\n255\n"
4. Identify and request the Non-Volatile Image DID to retrieve. The external Tool may append the Image Data Bytes (1024 bytes) to the created file while in edit mode.
5. The Total Number of Blocks indicate the number of polls needed to collect the data. Thus, the External Tool may request the chosen DID Total Number of Block—1 times more. The External Tool may append each Image Data Bytes response to the file while in edit mode.
6. Upon reading Block Number=Total Number of Blocks—1, then trim the Image Data Bytes by calculating the Number of Bytes to Trim=(1024) (Block Number+1)—Total Size of Image.
7. Close the file.
8. Now, this file can be open by Irfanview, which is available at http://www.irfanview.com.
9. The image will appear vertically flipped. The irfanview application has provisions to unflip it, for viewing by the human eye.
9a. Alternatively, the External Tool can implement the following algorithm, to unflip it automatically.

The FCM shall rollover the transmission of Image Data Bytes, to Block Number 0, if the Last DID request had Block Number=Total Number of Blocks—1.

Therefore, the present invention provides a statistics collection and evaluation system that collects statistics on a driver assistance system (that provides object detection and system response to detected objects and/or driving conditions) in order to facilitate determination of the effectiveness of the driver assistance system or systems on vehicles being driven on roads. A method of the present invention may evaluate the effectiveness of the driver assistance system with an image sensor for sensing a spatial region external to the vehicle. The method may include the steps of capturing images pertaining to the external spatial region, evaluating, in an image processor, the captured images and deriving image processing signals therefrom, and deriving probability events from the image processing signals. The method includes buffering, in predetermined time intervals, image processing signals and vehicle signals received in the driver assistance system through a vehicle data bus. After a probability event has been derived, a pre-event dataset, an event-dataset and a post-event dataset are stored. The pre-event dataset, the event dataset, and post-event dataset are retrieved from the vehicle and are processed to determine if the probability event was true or false. The pre-event dataset comprises image processing signals and vehicle signals buffered before the probability event occurred, the event dataset comprises image processing signals and vehicle signals at the time of the probability event, and the post-event dataset comprises image processing signals and vehicle signals received at a predetermined time or within a predetermined time period after the probability event occurred.

The driver assistance system provides data for use within a safety-critical application, and the safety critical application may be enabled after a larger number of pre-event datasets, event datasets, and post-event datasets from a plurality of vehicles has been processed and it has been determined that the probability events derived from the image processing signals are sufficiently free of false events. The safety-critical application may comprise an automatic braking application and/or an automatic evasive steering application and/or the like.

The step of determining if the probability event was true or false comprises detecting a driver response to the probability event. The driver response to the probability event may be represented by a vehicle signal indicating at least one of a brake activation, a steering wheel movement, a yaw rate change, a vehicle deceleration, and a vehicle acceleration.

The driver assistance system may include an image sensor and an image processor operatively connected to the image sensor for deriving image processing signals from images captured by the image sensor. A random access memory is operatively connected to the image processor, and a non-volatile memory is operatively connected to the image processor. A vehicle interface processor is operatively connected to the image processor and to a vehicle data bus. The vehicle communication processor periodically, or in response to an image processing signal or in response to a signal received on the vehicle data bus, instructs the image processor to buffer images in random access memory. The vehicle communication processor instructs the image processor to copy images from the random access memory to the non-volatile memory based on a priority determination in the vehicle communication processor.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066570, filed Nov. 27, 2012 and published Jun. 6, 2013 as International Publication No. WO 2013/081984, and/or PCT Application No. PCT/US2012/066571, filed Nov. 27, 2012 and published Jun. 6, 2013 as International Publication No. WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/103193; WO 2012/0116043; WO 2012/0145501; WO 2012/0145343; WO 2012/154919; WO 2013/019707; WO 2013/016409; WO 2012/145822; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869 and/or PCT Application No. PCT/US2012/056014, filed Sep. 19, 2012 and published Mar. 28, 2013 as International Publication No. WO 2013/043661, and/or PCT/US2012/071219, filed Dec. 21, 2012 and published Jul. 11, 2013 as International Publication No. WO 2013/103548, and/or PCT Application No. PCT/US2013/026101, filed Feb. 14, 2013 and published Aug. 22, 2013 as International Publication No. WO 2013/123161, and/or PCT Application No. PCT/US2013/027342, filed Feb. 22, 2013 and published Aug. 29, 2013 as International Publication No. WO 2013/126715, and/or PCT Application No. PCT/US2013/036701, filed Apr. 16, 2013 and published Oct. 24, 2013 as International Publication No. WO 2013/158592, and/or U.S. patent applications, Ser. No. 13/964,134, filed Aug. 12, 2013 and published Feb. 20, 2014 as U.S. Publication No. US-2014-0052340; Ser. No. 13/942,758, filed Jul. 16, 2013 and published Jan. 23, 2014 as U.S. Publication No. US-2014-0025240; Ser. No. 13/942,753, filed Jul. 16, 2013 and published Jan. 30, 2014 as U.S. Publication No. US-2014-0028852; Ser. No. 13/927,680, filed Jun. 26, 2013 and published Jan. 2, 2014 as U.S. Publication No. US-2014-0005907; Ser. No. 13/916,051, filed Jun. 12, 2013 and published Dec. 26, 2013 as U.S. Publication No. US-2013-0344736; Ser. No. 13/894,870, filed May 15, 2013 and published Nov. 28, 2013 as U.S. Publication No. US-2013-0314503; Ser. No. 13/887,724, filed May 6, 2013 and published Nov. 14, 2013 as U.S. Publication No. US-2013-0298866; Ser. No. 13/851,378, filed Mar. 27, 2013 and published Nov. 14, 2013 as U.S. Publication No. US-2013-0300869; Ser. No. 13/848,796, filed Mar. 22, 2012 and published Oct. 24, 2013 as U.S. Publication No. US-2013-0278769; Ser. No. 13/847,815, filed Mar. 20, 2013 and published Oct. 31, 2013 as U.S. Publication No. US-2013-0286193; Ser. No. 13/800,697, filed Mar. 13, 2013 and published Oct. 3, 2013 as U.S. Publication No. US-2013-0258077; Ser. No. 13/785,099, filed Mar. 5, 2013 and published Sep. 19, 2013 as U.S. Publication No. US-2013-0242099; Ser. No. 13/779,881, filed Feb. 28, 2013 and published Sep. 5, 2013 as U.S. Publication No. US-2013-0231825; Ser. No. 13/774,317, filed Feb. 22, 2013 and published Aug. 29, 2013 as U.S. Publication No. US-2013-0222592; Ser. No. 13/774,315, filed Feb. 22, 2013 and published Aug. 22, 2013 as U.S. Publication No. US-2013-0215271; Ser. No. 13/681,963, filed Nov. 20, 2012 and published Jun. 6, 2013 as U.S. Publication No. US-2013-0141578; Ser. No. 13/660,306, filed Oct. 25, 2012 and published May 9, 2013 as U.S. Publication No. US-2013-0116859; Ser. No. 13/653,577, filed Oct. 17, 2012 and published Apr. 25, 2013 as U.S. Publication No. US-2013-0099908; and/or Ser. No. 13/534,657, filed Jun. 27, 2012 and published Jan. 3, 2013 as U.S. Publication No. US-2013-0002873, and/or U.S. provisional applications, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/840,542; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/834,128, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/16,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/840,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/806,673, filed Mar. 29, 2013; Ser. No. 61/804,786, filed Mar. 25, 2013; Ser. No. 61/793,592, filed Mar. 15, 2013; Ser. No. 61/793,614, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/758,537, filed Jan. 30, 2013; Ser. No. 61/756,832, filed Jan. 25, 2013; Ser. No. 61/754,804, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/713,772, filed Oct. 15, 2012; Ser. No. 61/710,924, filed Oct. 8, 2012; Ser. No. 61/710,247, filed Oct. 2, 2012; and/or Ser. No. 61/696,416, filed Sep. 4, 2012, which are all hereby incorporated herein by reference in their entireties. The system may communicate with other communication systems via any suitable means, such as by utilizing aspects of the systems described in International Publication No. WO 2013/043661, PCT Application No. PCT/US10/038477, filed Jun. 14, 2010, and/or PCT Application No. PCT/US2012/066571, filed Nov. 27, 2012 and published Jun. 6, 2013 as International Publication No. WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416 and/or WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. pat. applications, Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012-075250; WO 2012/154919; WO 2012/0116043; WO 2012/0145501 and/or WO 2012/0145313, and/or PCT Application No. PCT/CA2012/000378, filed Apr. 25, 2012 and published Nov. 1, 2012 as International Publication No. WO 2012/145822, and/or PCT Application No. PCT/US2012/066571, filed Nov. 27, 2012 and published Jun. 6, 2013 as International Publication No. WO 2013/081985, and/or PCT Application No. PCT/US2012/068331, filed Dec. 7, 2012 and published Jun. 13, 2013 as International Publication No. WO 2013/086249, and/or PCT Application No. PCT/US2013/022119, filed Jan. 18, 2013 and published Jul. 25, 2013 as International Publication No. WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent applications, Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes specific examples, these examples are susceptible to further modification and change without departing from the fair meaning of the accompanying claims.

The invention claimed is:

1. A vehicular event recording system suitable for use in a vehicle, said vehicular event recording system comprising:
    a forward-viewing camera mounted at a front windshield of a vehicle equipped with said vehicular event recording system;
    said camera having a field of view forward of the equipped vehicle through the windshield;
    said camera comprising a lens and an image sensor;
    said image sensor comprising a plurality of photosensor elements arranged in a photosensor array having rows and columns;
    an event recorder disposed at the equipped vehicle;
    a control disposed at the equipped vehicle and comprising an image processor;
    wherein image data captured by said camera is provided to said control, and wherein provided captured image data is processed at said control for detecting objects present in the field of view of said camera;
    wherein said event recorder receives vehicle data via a vehicle data bus of the equipped vehicle;
    wherein vehicle data received at said event recorder comprises at least two selected from the group consisting of (i) vehicle speed of the equipped vehicle, (ii) vehicle location of the equipped vehicle, (iii) vehicle acceleration of the equipped vehicle and (iv) vehicle yaw rate of the equipped vehicle;
    wherein image data captured by said camera and vehicle data received at said event recorder during a first time period is stored in a first buffer memory of said event recorder;
    wherein image data captured by said camera and vehicle data received at said event recorder during a second time period immediately following the first time period is stored in a second buffer memory of said event recorder;
    wherein, during a third time period immediately following the second time period, previously stored image data captured by said camera and vehicle data received at said event recorder during the first time period is overwritten in the first buffer memory of said event recorder with image data captured by said camera and vehicle data received at said event recorder during the third time period;
    wherein, responsive to determination of an event, said vehicular event recording system transfers captured image data and received vehicle data stored in the first buffer memory and in the second buffer memory to data storage;
    wherein, during a post-event time period following the event, said vehicular event recording system stores image data captured by said camera and vehicle data received at said event recorder during the post-event time period in the data storage; and
    wherein the event is determined via a driving assistance system of the equipped vehicle.

2. The vehicular event recording system of claim 1, wherein, during a fourth time period immediately following the third time period, previously stored image data captured by said camera and vehicle data received at said event recorder during the second time period is overwritten in the second buffer memory of said event recorder with image data captured by said camera and vehicle data received at said event recorder during the fourth time period.

3. The vehicular event recording system of claim 1, wherein the first buffer memory comprises random access memory and wherein the second buffer memory comprises random access memory.

4. The vehicular event recording system of claim 1, wherein the data storage of said event recorder comprises non-volatile memory.

5. The vehicular event recording system of claim 1, wherein the event comprises a potential lane leaving event.

6. The vehicular event recording system of claim 5, wherein the driving assistance system of the equipped vehicle comprises a lane departure warning system of the equipped vehicle.

7. The vehicular event recording system of claim 6, wherein the potential lane leaving event comprises at least one selected from the group consisting of (i) when the equipped vehicle is heading towards a lane marking and (ii) when the equipped vehicle is within a certain distance of an edge of a lane marking.

8. The vehicular event recording system of claim 1, wherein the event comprises a potential collision event.

9. The vehicular event recording system of claim 8, wherein the driving assistance system of the equipped vehicle comprises a forward collision alert system of the equipped vehicle.

10. The vehicular event recording system of claim 9, wherein the potential collision event comprises the equipped vehicle heading towards an object present ahead of the equipped vehicle with the separation between the equipped vehicle and the object being less than a threshold.

11. The vehicular event recording system of claim 1, wherein the event is determined at least in part responsive to processing by said image processor of image data captured by said camera.

12. The vehicular event recording system of claim 1, wherein the first, second and third time periods are each greater than zero seconds and less than six seconds.

13. The vehicular event recording system of claim 1, wherein the first, second and third time periods are each greater than zero seconds and less than four seconds.

14. The vehicular event recording system of claim 1, wherein vehicle data received at said event recorder comprises (i) vehicle speed of the equipped vehicle, (ii) vehicle location of the equipped vehicle, (iii) vehicle acceleration of the equipped vehicle and (iv) vehicle yaw rate of the equipped vehicle.

15. The vehicular event recording system of claim 14, wherein vehicle data received at said event recorder comprises at least one selected from the group consisting of (i) brake deployment data of the equipped vehicle, (ii) airbag deployment data of the equipped vehicle and (iii) anti-lock braking system (ABS) deployment data of the equipped vehicle.

16. The vehicular event recording system of claim 1, wherein said image processor utilizes object detection software for detecting objects present in the field of view of said camera.

17. A vehicular event recording system suitable for use in a vehicle, said vehicular event recording system comprising:
  a forward-viewing camera mounted at a front windshield of a vehicle equipped with said vehicular event recording system;
  said camera having a field of view forward of the equipped vehicle through the windshield;
  said camera comprising a lens and an image sensor;
  said image sensor comprising a plurality of photosensor elements arranged in a photosensor array having rows and columns;
  an event recorder disposed at the equipped vehicle;
  a control disposed at the equipped vehicle and comprising an image processor;
  wherein image data captured by said camera is provided to said control, and wherein provided captured image data is processed at said control for detecting objects present in the field of view of said camera;
  wherein said event recorder receives vehicle data via a vehicle data bus of the equipped vehicle;
  wherein vehicle data received at said event recorder comprises at least two selected from the group consisting of (i) vehicle speed of the equipped vehicle, (ii) vehicle location of the equipped vehicle, (iii) vehicle acceleration of the equipped vehicle and (iv) vehicle yaw rate of the equipped vehicle;
  wherein image data captured by said camera and vehicle data received at said event recorder during a first time period is stored in a first buffer memory of said event recorder;
  wherein image data captured by said camera and vehicle data received at said event recorder during a second time period immediately following the first time period is stored in a second buffer memory of said event recorder;
  wherein, during a third time period immediately following the second time period, previously stored image data captured by said camera and vehicle data received at said event recorder during the first time period is overwritten in the first buffer memory of said event recorder with image data captured by said camera and vehicle data received at said event recorder during the third time period;
  wherein the first buffer memory comprises random access memory and wherein the second buffer memory comprises random access memory;
  wherein, responsive to determination of an event, said vehicular event recording system transfers captured image data and received vehicle data stored in the first buffer memory and in the second buffer memory to data storage;
  wherein, during a post-event time period following the event, said vehicular event recording system stores image data captured by said camera and vehicle data received at said event recorder during the post-event time period in the data storage;
  wherein the data storage of said event recorder comprises non-volatile memory;
  wherein the event is determined via a driving assistance system of the equipped vehicle; and
  wherein the event comprises a potential lane leaving event.

18. The vehicular event recording system of claim 17, wherein the driving assistance system of the equipped vehicle comprises a lane departure warning system of the equipped vehicle.

19. The vehicular event recording system of claim 17, wherein, during a fourth time period immediately following the third time period, previously stored image data captured by said camera and vehicle data received at said event recorder during the second time period is overwritten in the second buffer memory of said event recorder with image data captured by said camera and vehicle data received at said event recorder during the fourth time period.

20. The vehicular event recording system of claim 17, wherein the potential lane leaving event comprises at least one selected from the group consisting of (i) when the equipped vehicle is heading towards a lane marking and (ii) when the equipped vehicle is within a certain distance of an edge of a lane marking.

21. The vehicular event recording system of claim 17, wherein the event is determined at least in part responsive to processing by said image processor of image data captured by said camera.

22. The vehicular event recording system of claim 17, wherein the first, second and third time periods are each greater than zero seconds and less than six seconds.

23. The vehicular event recording system of claim 17, wherein vehicle data received at said event recorder comprises (i) vehicle speed of the equipped vehicle, (ii) vehicle location of the equipped vehicle, (iii) vehicle acceleration of the equipped vehicle and (iv) vehicle yaw rate of the equipped vehicle.

24. The vehicular event recording system of claim 23, wherein vehicle data received at said event recorder comprises at least one selected from the group consisting of (i) brake deployment data of the equipped vehicle, (ii) airbag deployment data of the equipped vehicle and (iii) anti-lock braking system (ABS) deployment data of the equipped vehicle.

25. The vehicular event recording system of claim 17, wherein said image processor utilizes object detection software for detecting objects present in the field of view of said camera.

26. A vehicular event recording system suitable for use in a vehicle, said vehicular event recording system comprising:
a forward-viewing camera mounted at a front windshield of a vehicle equipped with said vehicular event recording system;
said camera having a field of view forward of the equipped vehicle through the windshield;
said camera comprising a lens and an image sensor;
said image sensor comprising a plurality of photosensor elements arranged in a photosensor array having rows and columns;
an event recorder disposed at the equipped vehicle;
a control disposed at the equipped vehicle and comprising an image processor;
wherein image data captured by said camera is provided to said control, and wherein provided captured image data is processed at said control for detecting objects present in the field of view of said camera;
wherein said event recorder receives vehicle data via a vehicle data bus of the equipped vehicle;
wherein vehicle data received at said event recorder comprises at least two selected from the group consisting of (i) vehicle speed of the equipped vehicle, (ii) vehicle location of the equipped vehicle, (iii) vehicle acceleration of the equipped vehicle and (iv) vehicle yaw rate of the equipped vehicle;
wherein image data captured by said camera and vehicle data received at said event recorder during a first time period is stored in a first buffer memory of said event recorder;
wherein image data captured by said camera and vehicle data received at said event recorder during a second time period immediately following the first time period is stored in a second buffer memory of said event recorder;
wherein, during a third time period immediately following the second time period, previously stored image data captured by said camera and vehicle data received at said event recorder during the first time period is overwritten in the first buffer memory of said event recorder with image data captured by said camera and vehicle data received at said event recorder during the third time period;
wherein the first buffer memory comprises random access memory and wherein the second buffer memory comprises random access memory;
wherein, responsive to determination of an event, said vehicular event recording system transfers captured image data and received vehicle data stored in the first buffer memory and in the second buffer memory to data storage;
wherein, during a post-event time period following the event, said vehicular event recording system stores image data captured by said camera and vehicle data received at said event recorder during the post-event time period in the data storage;
wherein the data storage of said event recorder comprises non-volatile memory;
wherein the event is determined via a driving assistance system of the equipped vehicle; and
wherein the event comprises a potential collision event.

27. The vehicular event recording system of claim 26, wherein the driving assistance system of the equipped vehicle comprises a forward collision alert system of the equipped vehicle.

28. The vehicular event recording system of claim 26, wherein, during a fourth time period immediately following the third time period, previously stored image data captured by said camera and vehicle data received at said event recorder during the second time period is overwritten in the second buffer memory of said event recorder with image data captured by said camera and vehicle data received at said event recorder during the fourth time period.

29. The vehicular event recording system of claim 26, wherein the potential collision event comprises the equipped vehicle heading towards an object present ahead of the equipped vehicle with the separation between the equipped vehicle and the object being less than a threshold.

30. The vehicular event recording system of claim 26, wherein the event is determined at least in part responsive to processing by said image processor of image data captured by said camera.

31. The vehicular event recording system of claim 26, wherein the first, second and third time periods are each greater than zero seconds and less than six seconds.

32. The vehicular event recording system of claim 26, wherein vehicle data received at said event recorder comprises (i) vehicle speed of the equipped vehicle, (ii) vehicle location of the equipped vehicle, (iii) vehicle acceleration of the equipped vehicle and (iv) vehicle yaw rate of the equipped vehicle.

33. The vehicular event recording system of claim 32, wherein vehicle data received at said event recorder comprises at least one selected from the group consisting of (i) brake deployment data of the equipped vehicle, (ii) airbag deployment data of the equipped vehicle and (iii) anti-lock braking system of the equipped vehicle (ABS) deployment data of the equipped vehicle.

34. The vehicular event recording system of claim 26, wherein said image processor utilizes object detection software for detecting objects present in the field of view of said camera.

* * * * *